(12) United States Patent
Ikeda et al.

(10) Patent No.: US 8,381,590 B2
(45) Date of Patent: Feb. 26, 2013

(54) VIBRATING GYROSCOPE USING PIEZOELECTRIC FILM AND METHOD FOR MANUFACTURING SAME

(75) Inventors: Takashi Ikeda, Kaizuka (JP); Hiroshi Nishida, Takaishi (JP); Osamu Torayashiki, Akashi (JP); Mitsuhiko Takemura, Nishinomiya (JP); Tsuyoshi Fujimura, Amagasaki (JP); Ryuta Araki, Takarazuka (JP); Takafumi Moriguchi, Nishinomiya (JP); Nobutaka Teshima, Takatsuki (JP); Yasuyuki Hirata, Kobe (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 302 days.

(21) Appl. No.: 12/863,639

(22) PCT Filed: Nov. 26, 2008

(86) PCT No.: PCT/JP2008/071372
§ 371 (c)(1),
(2), (4) Date: Jul. 20, 2010

(87) PCT Pub. No.: WO2009/096086
PCT Pub. Date: Aug. 6, 2009

(65) Prior Publication Data
US 2010/0281976 A1    Nov. 11, 2010

(30) Foreign Application Priority Data

Jan. 29, 2008 (JP) .................................. 2008-017238
Feb. 8, 2008 (JP) .................................. 2008-028835

(51) Int. Cl.
*G01C 19/56* (2006.01)

(52) U.S. Cl. ..................................................... 73/504.13
(58) Field of Classification Search ............... 73/504.13, 73/504.12, 504.04
See application file for complete search history.

(56) References Cited

U.S. PATENT DOCUMENTS

| 4,655,081 | A | * | 4/1987 | Burdess ..................... 73/504.13 |
| 5,226,321 | A | * | 7/1993 | Varnham et al. ........... 73/514.02 |
| 5,540,094 | A | * | 7/1996 | Varnham et al. ........... 73/504.13 |

(Continued)

FOREIGN PATENT DOCUMENTS

| JP | 08-068638 A | 3/1996 |
| JP | 08-271258 A | 10/1996 |

(Continued)

*Primary Examiner* — Helen C. Kwok
(74) *Attorney, Agent, or Firm* — Marvin A. Motsenbocker; Mots Law, PLLC

(57) ABSTRACT

A vibrating gyroscope comprises a ring-shaped vibrating body (11) a leg portion (15) flexibly supporting the body (11) and having a fixed end, a fixed potential electrode (16), and a plurality of electrodes (13a-13d) with a piezoelectric film sandwiched between an upper and a lower-layer metallic film in a thickness direction thereof. When N is a natural number of 2 or more, the plurality of electrodes (13a-13d) include driving electrodes (13a) for a primary vibration in a vibration mode of $\cos N\theta$, which are each disposed $(360/N)°$ apart from each other in a circumferential direction, first detection electrodes (13b) and second detection electrodes (13d) for detecting a secondary vibration generated when an angular velocity is applied to the body (11), which are each disposed in a certain region related to the driving electrode (13a) Each of the electrodes is also disposed in a certain region of the body (11).

17 Claims, 20 Drawing Sheets

U.S. PATENT DOCUMENTS

| | | | |
|---|---|---|---|
| 5,616,864 A * | 4/1997 | Johnson et al. | 73/504.04 |
| 5,652,374 A * | 7/1997 | Chia et al. | 73/1.38 |
| 5,817,940 A * | 10/1998 | Kobayashi et al. | 73/504.12 |
| 5,932,804 A * | 8/1999 | Hopkin et al. | 73/504.13 |
| 6,151,964 A * | 11/2000 | Nakajima | 73/504.13 |
| 6,282,958 B1 * | 9/2001 | Fell et al. | 73/504.13 |
| 6,889,550 B2 * | 5/2005 | Beitia | 73/504.12 |
| 7,107,843 B2 * | 9/2006 | Ohuchi et al. | 73/504.16 |
| 7,360,423 B2 * | 4/2008 | Ayazi et al. | 73/504.12 |
| 2004/0134278 A1 * | 7/2004 | Fell et al. | 73/504.04 |
| 2011/0023601 A1 * | 2/2011 | Ikeda et al. | 73/504.13 |

FOREIGN PATENT DOCUMENTS

| | | |
|---|---|---|
| JP | 2000-009473 A | 1/2000 |
| JP | 2003-060264 A | 2/2003 |
| JP | 2003-302222 A | 10/2003 |
| JP | 2007-195316 A | 8/2007 |

* cited by examiner

VIBRATING GYROSCOPE USING PIEZOELECTRIC FILM AND METHOD FOR MANUFACTURING SAME

TECHNICAL FIELD

The present invention relates to a vibrating gyroscope using a piezoelectric film.

BACKGROUND ART

In recent years, vibrating gyroscopes using piezoelectric materials have been widely developed. There have been conventionally developed a gyroscope as described in Patent Document 1, including a vibrating body itself made of such a piezoelectric material. On the other hand, there is a gyroscope using a piezoelectric film that is formed on a vibrating body. For example, Patent Document 2 discloses a technique for, using a PZT film as a piezoelectric material, exciting a primary vibration of a vibrating body as well as for detecting partial distortion of a gyroscope, which is caused by a coriolis force generated when an angular velocity is applied to the vibrating body.

Reduction in size of a gyroscope itself is also an important issue as a wide variety of devices mounted with gyroscopes have been quickly reduced in size. In order to reduce the size of a gyroscope, significant improvement is required to accuracy of processing each member of the gyroscope. Desired in the industry are not only simple size reduction but also further improvement in performance of a gyroscope, namely, in accuracy of detecting an angular velocity. However, the configuration of the gyroscope described in Patent Document 2 does not satisfy the demand over the last few years for reduction in size or improvement in performance.

Patent Document 1: Japanese Unexamined Patent Publication No. H08-271258
Patent Document 2: Japanese Unexamined Patent Publication No. 2000-9473

DISCLOSURE OF THE INVENTION

Problems to be Solved by the Invention

As described above, it is very difficult to achieve reduction in size and high processing accuracy in a vibrating gyroscope using a piezoelectric film as well as to satisfy, at the same time, the demand for improvement in performance of the gyroscope. A gyroscope of a small size generally has a problem that, upon application of an angular velocity to a vibrating body, weakened is a signal to be detected by a detection electrode of the gyroscope. Therefore, the difference is decreased in such a small vibrating gyroscope between the signal to be essentially detected and a signal generated due to a sudden external impact (disturbance), which results in difficulty in improving detection accuracy of the gyroscope.

There are various types of external impacts that are received suddenly. For example, the ring-shaped vibrating body, which is described in Patent Document 2 already referred to, receives an impact that causes seesaw-like motions, about a fixed post at the center of the ring serving as an axis, in a vertical direction with respect to a plane including the ring. This impact excites a vibration in what is called a rocking mode. There is another impact by which the entire periphery of the ring-shaped member of the vibrating body supported by the fixed post is simultaneously bent upward or downward with respect to the plane including the ring. This impact excites a vibration in what is called a bounce mode. It is quite difficult to achieve a technique for detecting an accurate angular velocity even in cases where the vibrating gyroscope receives some of these impacts.

Solutions to the Problems

The present invention solves the above technical problems to significantly contribute to reduction in size and improvement in performance of a vibrating gyroscope using a piezoelectric film. The inventors firstly worked on one of the above technical problems and adopted a ring-shaped vibrating gyroscope as a basic configuration, which is recognized as receiving a relatively small influence of a disturbance. The inventors then studied intensively to obtain a configuration for solving the respective technical problems by causing the piezoelectric film to excite a primary vibration as well as to detect a secondary vibration generated by a coriolis force. Found as a result is that unique disposition of respective types of electrodes is required in a vibrating gyroscope using a piezoelectric film in order to apply to the vibrating gyroscope a dry process, which will enable high processing accuracy. The present invention was created through such a philosophy. It is noted that, in the present application, an "annular or polygonal vibrating gyroscope" is sometimes simply referred to as a "ring-shaped vibrating gyroscope".

A vibrating gyroscope according to the present invention includes: a ring-shaped vibrating body having a uniform plane; a leg portion flexibly supporting the ring-shaped vibrating body and having a fixed end; a fixed potential electrode formed on the plane, and a plurality of electrodes formed on the plane with a piezoelectric film sandwiched between an upper-layer metallic film and a lower-layer metallic film in a thickness direction thereof. When N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of first detection electrodes for detecting a secondary vibration generated when an angular velocity is applied to the ring-shaped vibrating body, which are each disposed $(90/N)°$ apart clockwise or counterclockwise from corresponding one of the driving electrodes, and a group of second detection electrodes for detecting the secondary vibration, which are each disposed $(180/N)°$ apart from corresponding one of the first detection electrodes. Further, each of the driving electrodes, the first detection electrodes, and the second detection electrodes is disposed in a region from an outer peripheral edge of the ring-shaped vibrating body to a vicinity of the outer peripheral edge or a region from an inner peripheral edge thereof to a vicinity of the inner peripheral edge.

In this vibrating gyroscope, since a piezoelectric element is formed as an electrode in the specific region described above on the plane of the ring-shaped vibrating body, the piezoelectric element functions as a single axis angular velocity sensor and is capable of exciting the primary vibration as well as detecting the secondary vibration. In other words, this vibrating gyroscope is configured to excite the primary vibration in a plane identical with that including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrode and the ring-shaped vibrating body with a high degree of accuracy in accordance with the dry process technique. Furthermore, since the piezoelectric element is disposed in the above specific region, this vibrating gyroscope has a degree of flexibility to be applicable to the vibration mode of cosNθ when N is a natural number of 2 or more. A plurality of examples of the vibration mode of cosNθ are described in, for example, Japanese Published Patent Publication No. 2005-529306 or Japanese Patent Application No. 2007-209014 that was filed by the applicant of the present application. The term "flexible" is used to mean "so as to allow the vibrating body to vibrate" in the present application.

Another vibrating gyroscope according to the present invention includes: a ring-shaped vibrating body having a uniform plane; a leg portion flexibly supporting the ring-shaped vibrating body and having a fixed end; a fixed potential electrode formed on the plane, and a plurality of electrodes formed on the plane with a piezoelectric film sandwiched between an upper-layer metallic film and a lower-layer metallic film in a thickness direction thereof. When N is a natural number of 2 or more, the plurality of electrodes include a group of driving electrodes for exciting a primary vibration of the ring-shaped vibrating body in a vibration mode of cosNθ, which are disposed (360/N)° apart from each other in a circumferential direction, a group of monitor electrodes each disposed (180/N)° apart from corresponding one of the driving electrodes, a group of first detection electrodes for detecting a secondary vibration generated when an angular velocity is applied to the ring-shaped vibrating body, which are each disposed (90/N)° apart clockwise or counterclockwise from corresponding one of the driving electrodes, and a group of second detection electrodes for detecting the secondary vibration, which are each disposed (180/N)° apart from corresponding one of the first detection electrodes. Further, each of the driving electrodes, the monitor electrodes, the first detection electrodes, and the second detection electrodes is disposed in a region from an outer peripheral edge of the ring-shaped vibrating body to a vicinity of the outer peripheral edge or a region from an inner peripheral edge thereof to a vicinity of the inner peripheral edge.

In this vibrating gyroscope, since a piezoelectric element is formed as an electrode in the specific region described above on the plane of the ring-shaped vibrating body, the piezoelectric element functions as a single axis angular velocity sensor and is capable of exciting the primary vibration as well as detecting the secondary vibration. In other words, this vibrating gyroscope is configured to excite the primary vibration in a plane identical with that including the piezoelectric element on the ring-shaped vibrating body as well as to control the motions of the ring-shaped vibrating body, with no piezoelectric element being formed on a side surf-ace of the ring-shaped vibrating body. As a result, it is possible to fabricate the electrode and the ring-shaped vibrating body with a high degree of accuracy in accordance with the dry process technique. Furthermore, since the piezoelectric element is disposed in the above specific region, this vibrating gyroscope has a degree of flexibility to be applicable to the vibration mode of cosNθ when N is a natural number of 2 or more.

A method for manufacturing a vibrating gyroscope according to the present invention includes the steps of: forming an insulative film uniformly on a silicon substrate; forming a lower-layer metallic film uniformly on the insulative film; forming a piezoelectric film uniformly on the lower-layer metallic film; forming an upper-layer metallic film uniformly on the piezoelectric film; patterning a first resist film on the upper-layer metallic film; dry etching the upper-layer metallic film to expose the piezoelectric film; and patterning a second resist film on the upper-layer metallic film and on the piezoelectric film. This method for manufacturing a vibrating gyroscope according to the present invention further includes, after the patterning, the step in which the lower-layer metallic film, the insulative film, and the silicon substrate are dry etched, using the second resist film, the upper-layer metallic film, or the piezoelectric film as an etching mask, to form a ring-shaped vibrating body and a leg portion flexibly supporting the ring-shaped vibrating body and having a fixed end, as well as, when N is a natural number of 2 or more, a group of driving electrodes for exciting a primary vibration of the ring-shaped vibrating body in a vibration mode of cosNθ, which are disposed (360/N)° apart from each other in a circumferential direction, a group of first detection electrodes for detecting a secondary vibration generated when an angular velocity is applied to the ring-shaped vibrating body, which are each disposed (90/N)° apart clockwise or counterclockwise from corresponding one of the driving electrodes, and a group of second detection electrodes for detecting the secondary vibration, which are each disposed (180/N)° apart from corresponding one of the first detection electrodes.

Since fabrication with a high degree of accuracy in accordance with the dry process technique is applicable to this method for manufacturing a vibrating gyroscope, it is possible to form a piezoelectric element in the specific region on the plane of the ring-shaped vibrating body. As a result, the vibrating gyroscope is manufactured with no piezoelectric element being disposed on a side surface of the ring-shaped vibrating body, while only the piezoelectric element on the plane being capable of functioning as a single axis angular velocity sensor to excite the primary vibration as well as to detect the secondary vibration.

Moreover, since the ring-shaped vibrating body is formed with the silicon substrate, it is possible to apply the known silicon trench etching technique with an adequately high selectivity with respect to the resist film. Even in a case where the resist film disappears, there is provided an adequate selectivity such that the upper-layer metallic film or the piezoelectric film provided therebelow serves as a mask for etching silicon.

Another method for manufacturing a vibrating gyroscope according to the present invention includes the steps of: forming an insulative film uniformly on a silicon substrate; forming a lower-layer metallic film uniformly on the insulative film; forming a piezoelectric film uniformly on the lower-layer metallic film; forming an upper-layer metallic film uniformly on the piezoelectric film; patterning a first resist film on the upper-layer metallic film; dry etching the upper-layer metallic film and the piezoelectric film, using the first resist film as an etching mask, to expose the lower-layer metallic film; and patterning a second resist film on the upper-layer metallic film and on the lower-layer metallic film. This method for manufacturing a vibrating gyroscope according to the present invention further includes, after the patterning, the step in which the insulative film and the silicon substrate are dry etched, using the second resist film, the upper-layer metallic film, or the lower-layer metallic film as an etching mask, to form a ring-shaped vibrating body and a leg portion flexibly supporting the ring-shaped vibrating body and having a fixed end, as well as, when N is a natural number of 2 or more, a group of driving electrodes for exciting a primary vibration of the ring-shaped vibrating body in a vibration mode of cosNθ, which are disposed (360/N)° apart from each other in a circumferential direction, a group of first detection electrodes for detecting a secondary vibration generated when an angular velocity is applied to the ring-shaped vibrating body, which are each disposed (90/N)° apart clockwise or counterclockwise from corresponding one of the driving electrodes, and a group of second detection electrodes for detecting the secondary vibration, which are each disposed (180/N)° apart from corresponding one of the first detection electrodes.

Since fabrication with a high degree of accuracy in accordance with the dry process technique is applicable also to this method for manufacturing a vibrating gyroscope, it is possible to form a piezoelectric element in the specific region on the plane of the ring-shaped vibrating body. As a result, the vibrating gyroscope is manufactured with no piezoelectric element being disposed on a side surface of the ring-shaped vibrating body, while only the piezoelectric element on the plane being capable of functioning as a single axis angular velocity sensor to excite the primary vibration as well as to detect the secondary vibration.

Effects of the Invention

In a vibrating gyroscope according to the present invention, it is possible to excite the primary vibration in the plane identical with that including the piezoelectric element on the ring-shaped vibrating body as well as to control the motions of the ring-shaped vibrating body, with no piezoelectric element being formed on a side surface of the ring-shaped vibrating body. Further, it is possible to fabricate the electrode and the ring-shaped vibrating body with a high degree of accuracy by applying the dry process technique to the plane of the ring-shaped vibrating body. Moreover, since the piezoelectric element is disposed in the specific region, this vibrating gyroscope has a degree of flexibility to be applicable to the vibration mode of $\cos N\theta$ when N is a natural number of 2 or more. Since fabrication with a high degree of accuracy in accordance with the dry process technique is applicable to a method for manufacturing a vibrating gyroscope according to the present invention, it is possible to form the piezoelectric element in the specific region on the plane of the ring-shaped vibrating body. As a result, the vibrating gyroscope is manufactured with no piezoelectric element being formed on a side surface of the ring-shaped vibrating body, while only the piezoelectric element on the plane being capable of functioning as a single axis angular velocity sensor to excite the primary vibration as well as to detect the secondary vibration.

BEST MODE FOR CARRYING OUT THE INVENTION

<First Embodiment>

Figure 1:
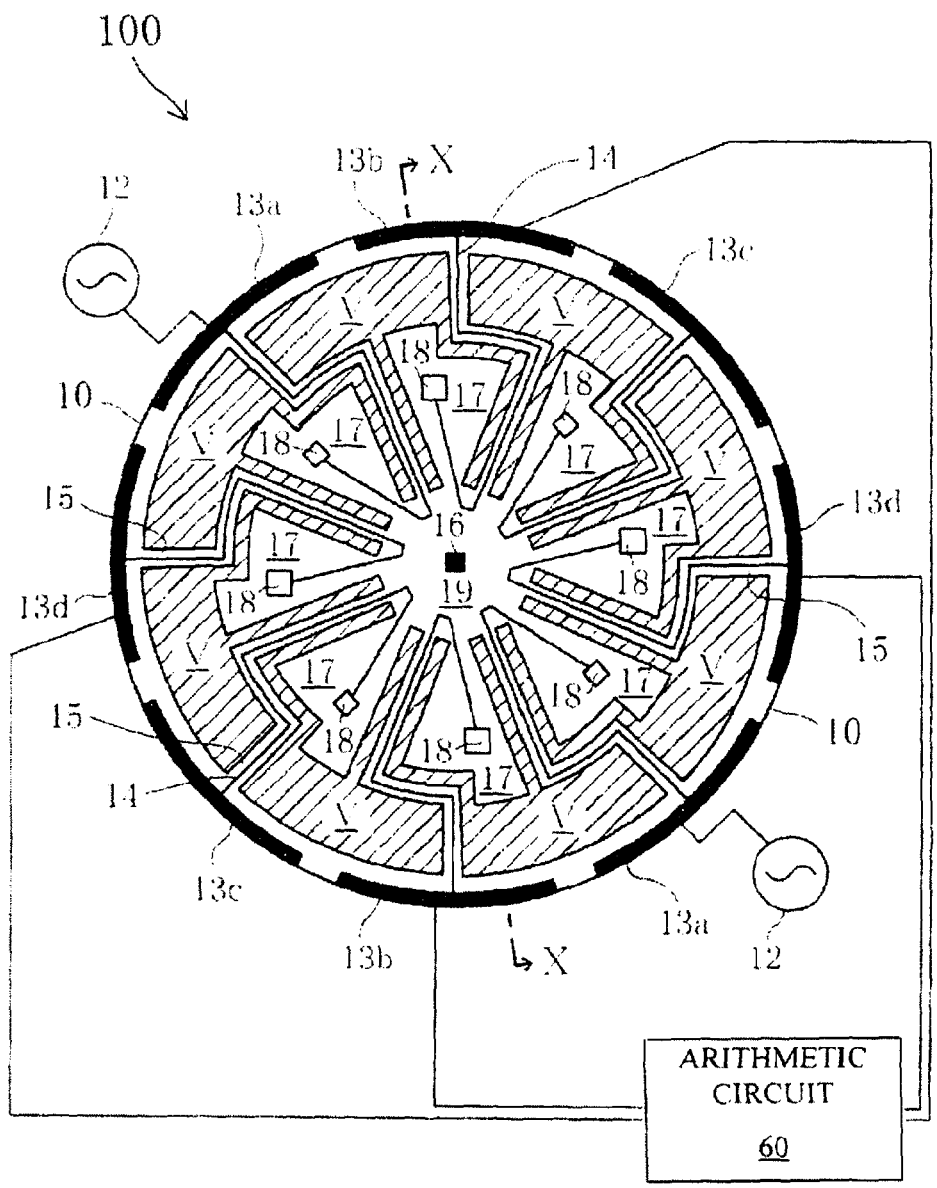
FIG. 1 is a front view of a structure having a principal function in a ring-shaped vibrating gyroscope according to an embodiment of the present invention.
Figure 2A:
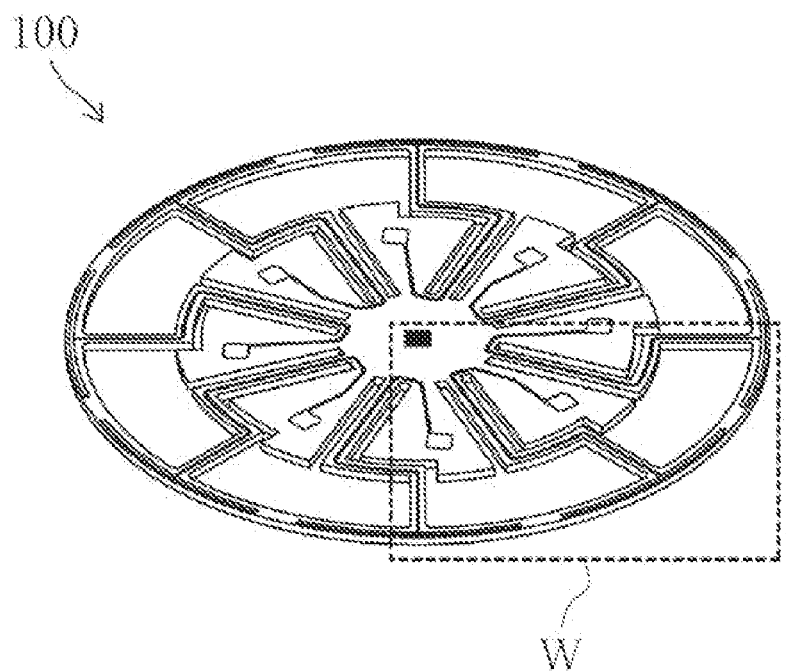
FIG. 2A is a perspective view of the structure shown in FIG. 1.
Figure 2B:
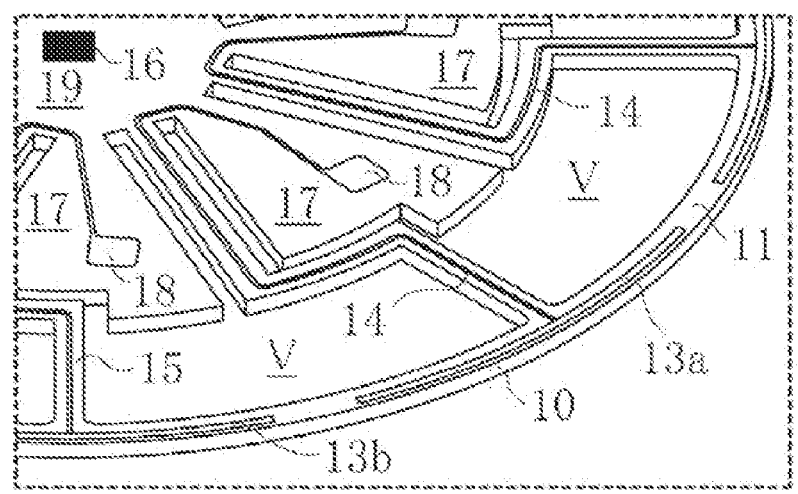
FIG. 2B is an enlarged view of a part (W portion) of FIG. 2A.
Figure 3:
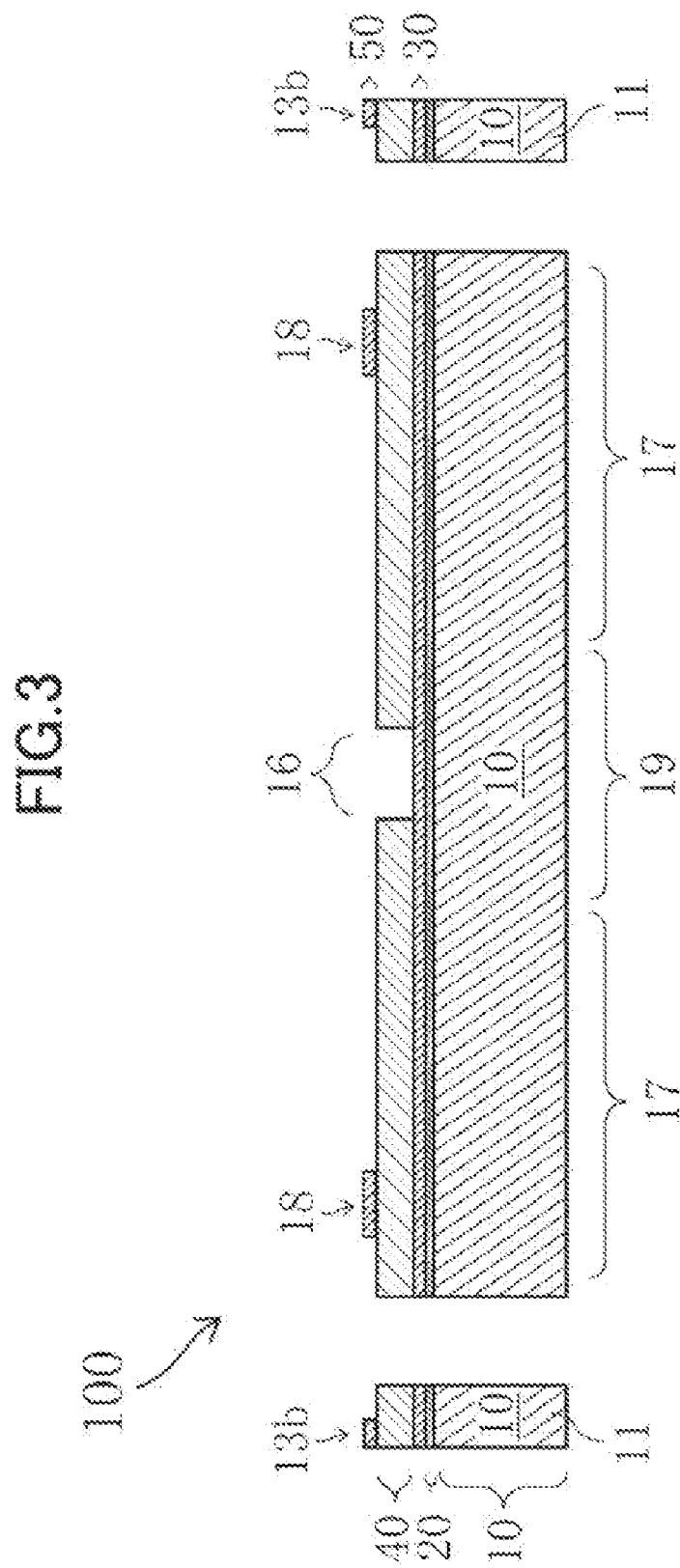
FIG. 3 is a cross sectional view taken along line X-X of FIG. 1.

FIG. 1 is a front view of a structure having a principal function in a ring-shaped vibrating gyroscope 100 in the present embodiment. FIG. 2A is a perspective view of the structure shown in FIG. 1, and FIG. 2B is an enlarged view of a part (W portion) of FIG. 2A. FIG. 3 is a cross sectional view taken along line X-X of FIG. 1.

As shown in FIGS. 1 to 3, the ring-shaped vibrating gyroscope 100 according to the present embodiment is generally divided into three regions. A first region includes a ring-shaped vibrating body 11 formed with a silicon substrate 10, a silicon oxide film 20 on an upper plane (hereinafter, referred to as an upper surface) of the ring-shaped vibrating body 11, and a plurality of electrodes 13a to 13d formed thereon with a piezoelectric film 40 sandwiched between a lower-layer metallic film 30 and an upper-layer metallic film 50. In the present embodiment, the upper-layer metallic film 50 configuring the plurality of electrodes 13a to 13d has an outer end formed inside by approximately 1 µm with respect to the outer peripheral edge of the ring-shaped vibrating body 11 that has a ring-shaped plane of approximately 40 µm wide, so as to be approximately 18 µm wide. The upper-layer metallic film 50 is formed outside a line connecting centers (hereinafter, simply referred to as a center line) of both ends in the width direction of the ring-shaped plane that serves as the upper surface of the ring-shaped vibrating body 11.

In the present embodiment, a primary vibration of the ring-shaped vibrating gyroscope 100 is excited in a vibration mode of $\cos 2\theta$. Thus, the plurality of electrodes 13a to 13d are categorized into two driving electrodes 13a, 13a that are disposed 180° apart from each other in a circumferential direction, two monitor electrodes 13c, 13c that are disposed 90° apart from the driving electrodes 13a, 13a respectively in the circumferential direction, and first detection electrodes 13b, 13b as well as second detection electrodes 13d, 13d for detecting a secondary vibration generated when an angular velocity is applied to the ring-shaped vibrating gyroscope 100. In the present embodiment, the first detection electrodes 13b, 13b are disposed 45° apart clockwise from the driving electrodes 13a, 13a respectively in the circumferential direction. The second detection electrodes 13d, 13d are disposed 90° apart from the first detection electrodes respectively in the circumferential direction, in other words, 45° apart counterclockwise from the driving electrodes 13a, 13a respectively in the circumferential direction.

In the present embodiment, the lower-layer metallic film 30 and the upper-layer metallic film 50 are 100 nm thick, respectively, and the piezoelectric film 40 is 3 µm thick. The silicon substrate 10 is 100 µm thick. Each of the regions marked by diagonal lines and denoted by V in FIG. 1, or each of the regions denoted by V in FIG. 2B is a spaced or void portion in which there exists no structure configuring the ring-shaped vibrating gyroscope 100. These regions are provided expediently for easier comprehension of these figures.

A second region includes leg portions 15, ..., 15 that are each connected to a part of the ring-shaped vibrating body 11. These leg portions 15, ..., 15 are also formed with the silicon substrate 10. Formed on the entire upper surfaces of the leg portions 15, ..., 15 are the silicon oxide film 20, the lower-layer metallic film 30, and the piezoelectric film 40 described above which are provided continuously to the portions of the respective films on the ring-shaped vibrating body 11. Further formed on a center line in the upper surface of the piezoelectric film 40 is the upper-layer metallic film 50 which serves as metal tracks 14, ..., 14 of approximately 8 µm wide.

A third region includes a post 19 that is formed with the silicon substrate 10 provided continuously to the portions of the above leg portions 15, ..., 15, and electrode pad fixed ends 17, ..., 17 that are provided with electrode pads 18, ..., 18, respectively. In the present embodiment, the post 19 is connected to a package portion (not shown) of the ring-shaped vibrating gyroscope 100 and serves as a fixed end. The ring-shaped vibrating gyroscope 100 according to the present embodiment is provided with the electrode pad fixed ends 17, ..., 17 that serve as fixed ends other than the post 19. The electrode pad fixed ends 17, ..., 17 are connected only to the post 19 and the package portion described above, thereby substantially not disturbing the motions of the ring-shaped vibrating body 11. Further, as shown in FIG. 3, formed on the upper surfaces of the post 19 and the electrode pad fixed ends 17, ..., 17 are the silicon oxide film 20, the lower-layer metallic film 30, and the piezoelectric film 40 described above which are provided continuously to the portions of the respective films on the leg portions 15, ..., 15 except for the portion of the fixed potential electrode 16 functioning as a ground electrode. In this case, the lower-layer metallic film 30 formed on the silicon oxide film 20 functions as the fixed potential electrode 16. On the upper surface of the piezoelectric film 40 on the post 19 and the electrode pad fixed ends 17, ..., 17, there are formed the metal tracks 14, ..., 14 as well as the electrode pads 18, ..., 18 that are provided continuously to the portions of the metal tracks on the leg portions 15, ..., 15.

Described next with reference to FIGS. 4A to 4F is a method for manufacturing the ring-shaped vibrating gyroscope 100 according to the present embodiment. FIGS. 4A to 4F are cross sectional views each showing a part of the portion shown in FIG. 3.

Figure 4A:
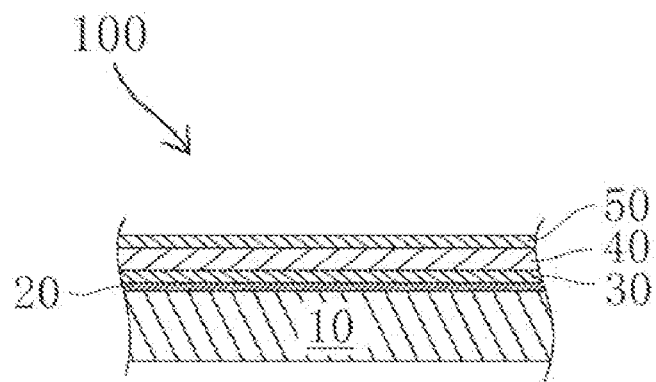
FIG. 4A is a cross sectional view showing a process in the steps of manufacturing a part of the ring-shaped vibrating gyroscope according to the embodiment of the present invention.
Figure 4B:
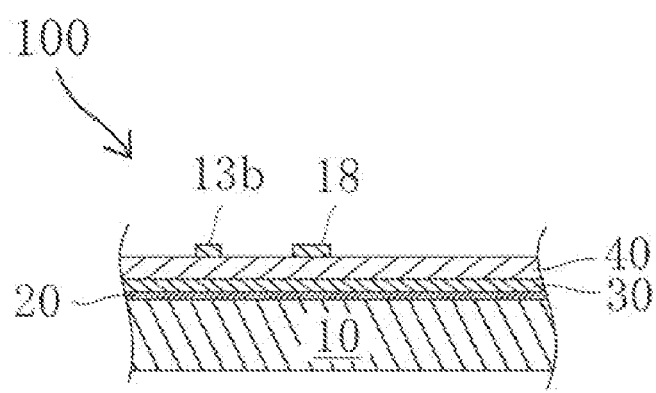
FIG. 4B is a cross sectional view showing a process in the steps of manufacturing the part of the ring-shaped vibrating gyroscope according to the embodiment of the present invention.

Firstly, as shown in FIG. 4A, laminated on the silicon substrate 10 are the silicon oxide film 20, the lower-layer metallic film 30, the piezoelectric film 40, and the upper-layer metallic film 50. Each of these films is formed by known film formation means. In the present embodiment, the silicon oxide film 20 is a thermally oxidized film obtained by known means. The lower-layer metallic film 30, the piezoelectric film 40, and the upper-layer metallic film 50 are each formed in accordance with a known sputtering method. It is noted that formation of each of these films is not limited to the above example but these films may be alternatively formed by any other know means.

The upper-layer metallic film 50 is then partially etched. In the present embodiment, there is formed a known resist film on the upper-layer metallic film 50, and dry etching is then performed on the basis of a pattern formed in accordance with the photolithographic technique, so that formed is the upper-layer metallic film 50 shown in FIG. 4B. In this case, the upper-layer metallic film 50 was dry etched under the condition for the known reactive ion etching (RIE) using argon (Ar) or mixed gas containing argon (Ar) and oxygen ($O_2$).

Figure 4C:
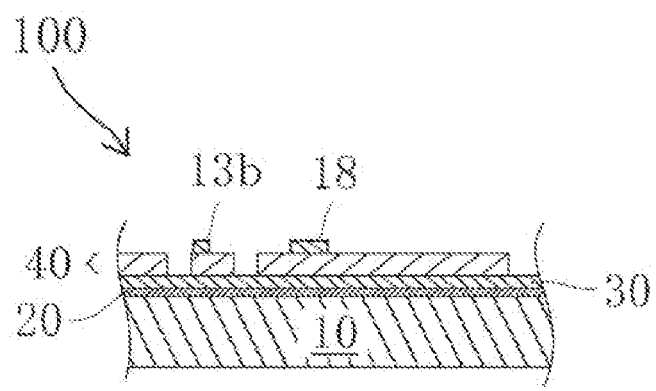
FIG. 4C is a cross sectional view showing a process in the steps of manufacturing the part of the ring-shaped vibrating gyroscope according to the embodiment of the present invention.

Thereafter, as shown in FIG. 4C, the piezoelectric film 40 is partially etched. Firstly, similarly to the above, the piezoelectric film 40 is dry etched on the basis of the resist film that is patterned in accordance with the photolithographic technique. In the present embodiment, the piezoelectric film 40 was dry etched under the condition for the known reactive ion etching (ME) using mixed gas containing argon (Ar) and $C_2F_6$ gas, or mixed gas containing argon (Ar), $C_2F_6$ gas, and $CHF_3$ gas.

Figure 4D:
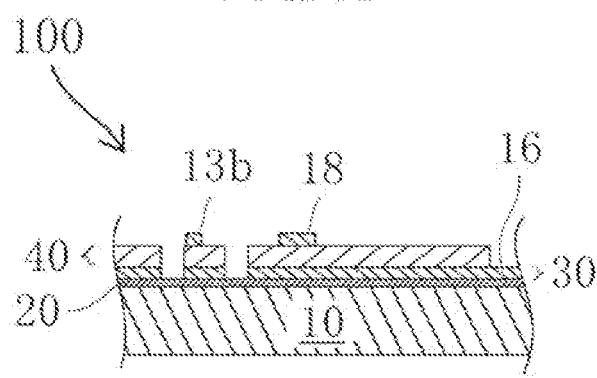
FIG. 4D is a cross sectional view showing a process in the steps of manufacturing the part of the ring-shaped vibrating gyroscope according to the embodiment of the present invention.

Then, as shown in FIG. 4D, the lower-layer metallic film 30 is partially etched. In the present embodiment, dry etching is performed using the resist film that is again patterned in accordance with the photolithographic technique, so as to form the fixed potential electrode 16 utilizing the lower-layer metallic film 30. In the present embodiment, the fixed potential electrode 16 is used as the ground electrode. In the present embodiment, the lower-layer metallic film 30 was dry etched under the condition for the known reactive ion etching (RIE) using argon (Ar) or mixed gas containing argon (Ar) and oxygen ($O_2$).

In the present embodiment, the resist film is formed to be approximately 4 µm thick so that the silicon oxide film 20 and the silicon substrate 10 are thereafter continuously etched with the above resist film formed again serving as an etching mask. However, even in a case where this resist film disappears during etching the silicon substrate 10, the selectivity of the etching rate relative to an etchant applied to the silicon substrate 10 functions advantageously. Therefore, the performance of the lower-layer metallic film 30 is not substantially affected by the above etching.

Figure 4E:
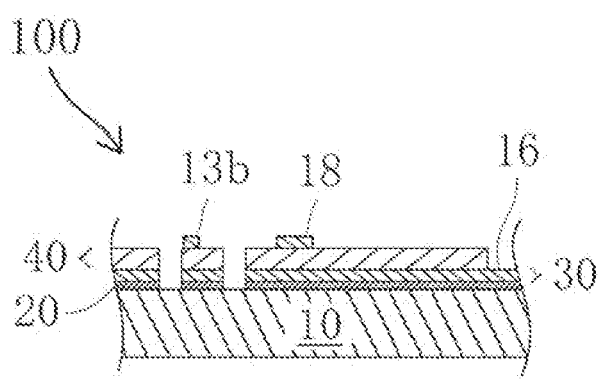
FIG. 4E is a cross sectional view showing a process in the steps of manufacturing the part of the ring-shaped vibrating gyroscope according to the embodiment of the present invention.
Figure 4F:
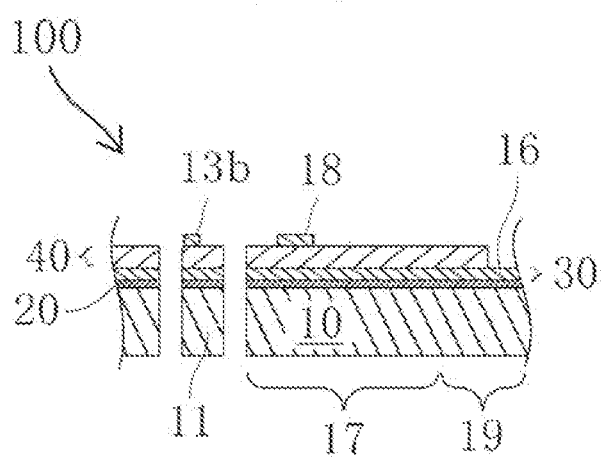
FIG. 4F is a cross sectional view showing a process in the steps of manufacturing the part of the ring-shaped vibrating gyroscope according to the embodiment of the present invention.

Thereafter, as shown in FIGS. 4E and 4F, the silicon oxide film 20 and the silicon substrate 10 are dry etched as described above using the resist film that is provided for etching the lower-layer metallic film 30. In the present embodiment, the silicon oxide film 20 was dry etched under the condition for the known reactive ion etching (RIE) using argon (Ar) or mixed gas containing argon (Ar) and oxygen ($O_2$). The known silicon trench etching technique is applied to the dry etching of the silicon substrate 10 in the present embodiment. In this case, the silicon substrate 10 is etched so as to be penetrated. Thus, the dry etching described above is performed in a state where a protective substrate, which prevents a stage to allow the silicon substrate 10 mounted thereon from being exposed to plasma upon penetration, is attached to the silicon substrate 10 with grease of high thermal conductivity serving as a lower layer of the silicon substrate 10. Accordingly, it is a preferable aspect to adopt the dry etching technique described in Japanese Unexamined Patent Publication No. 2002-158214, for example, in order to prevent corrosion of a plane perpendicular to the thickness direction of the silicon substrate 10, that is, an etching side surface, after the penetration.

As described above, the silicon substrate 10 and the respective films laminated on the silicon substrate 10 are etched to form the main structural portion of the ring-shaped vibrating gyroscope 100. Subsequently performed are the steps of accommodating the main structural portion into the package by known means as well as wiring. As a result, there is formed the ring-shaped vibrating gyroscope 100.

Described below are the functions of the respective electrodes included in the ring-shaped vibrating gyroscope 100. As already described, in the present embodiment, excited is the primary vibration in the vibration mode of $\cos 2\theta$. As the lower-layer metallic film 30 is formed continuously to the fixed potential electrode 16 being grounded, the lower-layer metallic film 30 is uniformly set to 0 V.

Firstly, as shown in FIG. 1, an alternating-current voltage of 1 $V_{P\text{-}0}$ is applied to each of the two driving electrodes 13a, 13a. As a result, the piezoelectric film 40 is contracted to excite the primary vibration. In the present embodiment, the upper-layer metallic film 50 is formed outside the center line in the upper surface of the ring-shaped vibrating body 11. Accordingly, it is possible to convert the expansion/contraction motions of the piezoelectric film 40 into the primary vibration of the ring-shaped vibrating body 11 with no upper-layer metallic film 50 being provided on a side surface of the ring-shaped vibrating body 11.

Then, each of the monitor electrodes 13c, 13c shown in FIG. 1 detects an amplitude and a resonant frequency of the above primary vibration, and transmits a signal to a known feedback control circuit (not shown). The feedback control circuit in the present embodiment controls using the signals from the monitor electrodes 13c, 13c such that the frequency of the alternating-current voltage applied to each of the driving electrodes 13a, 13a is equal to the natural frequency of the ring-shaped vibrating body 11, as well as such that the amplitude of the ring-shaped vibrating body 11 has a constant value. As a result, the ring-shaped vibrating body 11 is vibrated constantly and continuously.

After the excitation of the primary vibration described above, upon application of an angular velocity about an axis perpendicular to the plane on which the ring-shaped vibrating gyroscope 100 shown in FIG. 1 is disposed (namely, an axis perpendicular to the drawing sheet, which is hereinafter referred to simply as a "perpendicular axis"), in the present embodiment in the vibration mode of $\cos 2\theta$, caused by a coriolis force is a secondary vibration having a new vibration axis that is inclined at 45° in either side with respect to the vibration axis of the primary vibration.

Figure 9:
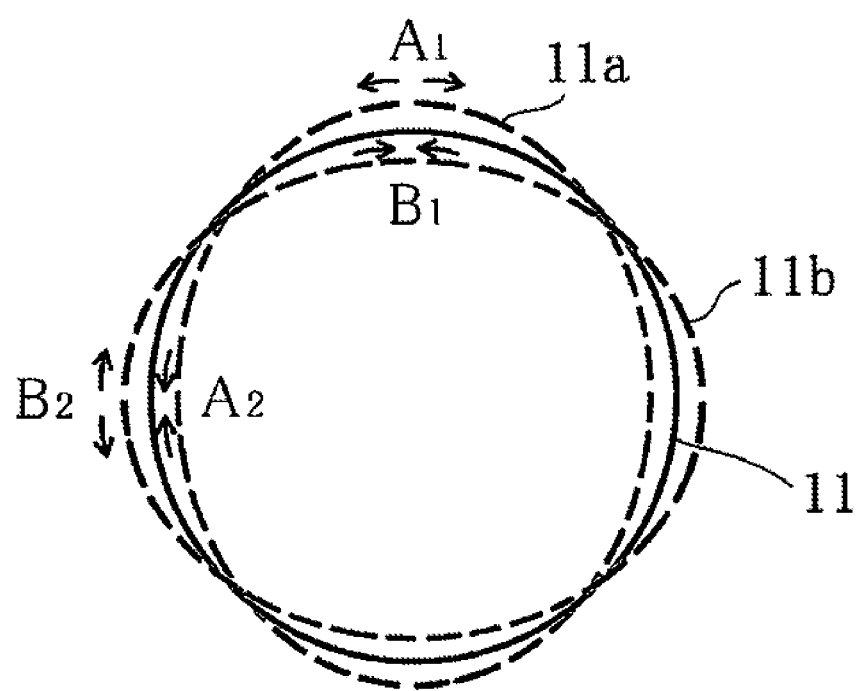
FIG. 9 is a view conceptually illustrating positive/negative polarities of electrical signals of a first detection electrode and a second detection electrode.

This secondary vibration is detected by the two first detection electrodes 13b, 13b as well as by the two second detection electrodes 13d, 13d. In the present embodiment, as shown in FIG. 1, the first detection electrodes 13b, 13b and the second detection electrodes 13d, 13d are respectively disposed in correspondence with the vibration axis of the secondary vibration. Moreover, all the first detection electrodes 13b, 13b and the second detection electrodes 13d, 13d are formed outside the center line in the upper surface of the ring-shaped vibrating body 11. Therefore, the first detection electrodes 13b, 13b and the second detection electrodes 13d, 13d generate electrical signals of positive/negative polarities inverse to each other due to the secondary vibration excited upon the application of the angular velocity. As shown in FIG. 9, when, for example, the ring-shaped vibrating body 11 is transformed into a vibration state shown as a vibrating body 11a in a vertically longer elliptical shape, the piezoelectric film 40 at the location of the first detection electrode 13b disposed outside the center line is expanded in directions indicated by arrows $A_1$, while the piezoelectric film 40 at the location of the second detection electrode 13d disposed outside the center line is contracted in directions indicated by arrows $A_2$. Accordingly, the electrical signals of these electrodes have positive/negative polarities inverse to each other. Similarly, when the ring-shaped vibrating body 11 is transformed into a vibration state shown as a ring-shaped vibrating body 11b in a horizontally longer elliptical shape, the piezoelectric film 40 at the location of the first detection electrode 13b is contracted in directions indicated by arrows $B_1$, while the piezoelectric film 40 at the location of the second detection electrode 13d is expanded in directions indicated by arrows $B_2$. Accordingly, also in this case, the electrical signals of these electrodes have positive/negative polarities inverse to each other.

Then, obtained in an arithmetic circuit 60 functioning as a known difference circuit are differences between the electrical signals of the first detection electrodes 13b, 13b and those of the second detection electrodes 13d, 13d. Resulting detection signals of this case have approximately doubled detectability in comparison to the case with only the first detection signals or the second detection signals.

In the present embodiment, formed on the leg portions 15, . . . , 15 are the upper-layer metallic film 50 which serves as the metal tracks 14, the piezoelectric film 40, and the lower-layer metallic film 30. Assume a case where there is generated a disturbance (external impact) exciting a vibration of the ring-shaped vibrating gyroscope 100 in the bounce mode already described. As the leg portions 15, . . . , 15 are shifted in one direction along the perpendicular axis of the ring-shaped vibrating gyroscope 100, there are generated electrical signals in accordance with the expansion/contraction motions of the piezoelectric film 40 at the locations on the respective leg portions 15, . . . , 15. However, in this case, the positive/negative polarities of the above electrical signals are identical with one another at the leg portions that are connected to all the electrodes for detecting the secondary vibration. Thus, when the arithmetic circuit 60 obtains the differences therebetween, the signals from the respective leg portions 15 are substantially canceled.

On the other hand, assume a case where there is generated a disturbance exciting a vibration in the rocking mode. As shown in FIG. 1 for example, since the first detection electrodes 13b, 13b are disposed 180° apart from each other in the circumferential direction, the expansion/contraction motions of the piezoelectric film 40 at the locations on the leg portions connected to the respective first detection electrodes 13b, 13b are reverse to each other. As a result, the respective first detection electrodes 13b generate the electrical signals of positive/negative polarities inverse to each other. Accordingly, these electrical signals are to be canceled each other. The phenomenon described above is applicable to the above electrical signals of the leg portions connected to the respective second detection electrodes 13d. Consequently, the arithmetic circuit 60 is not substantially affected by the vibration in the rocking mode.

As described above, because the ring-shaped vibrating gyroscope 100 according to the present embodiment includes the two first detection electrodes 13b, 13b and the two second detection electrodes 13d, 13d, improved are detectability of a secondary vibration as well as resistance to an external impact that excites a vibration in the bounce mode or in the rocking mode.

<Second Embodiment>

Figure 5:
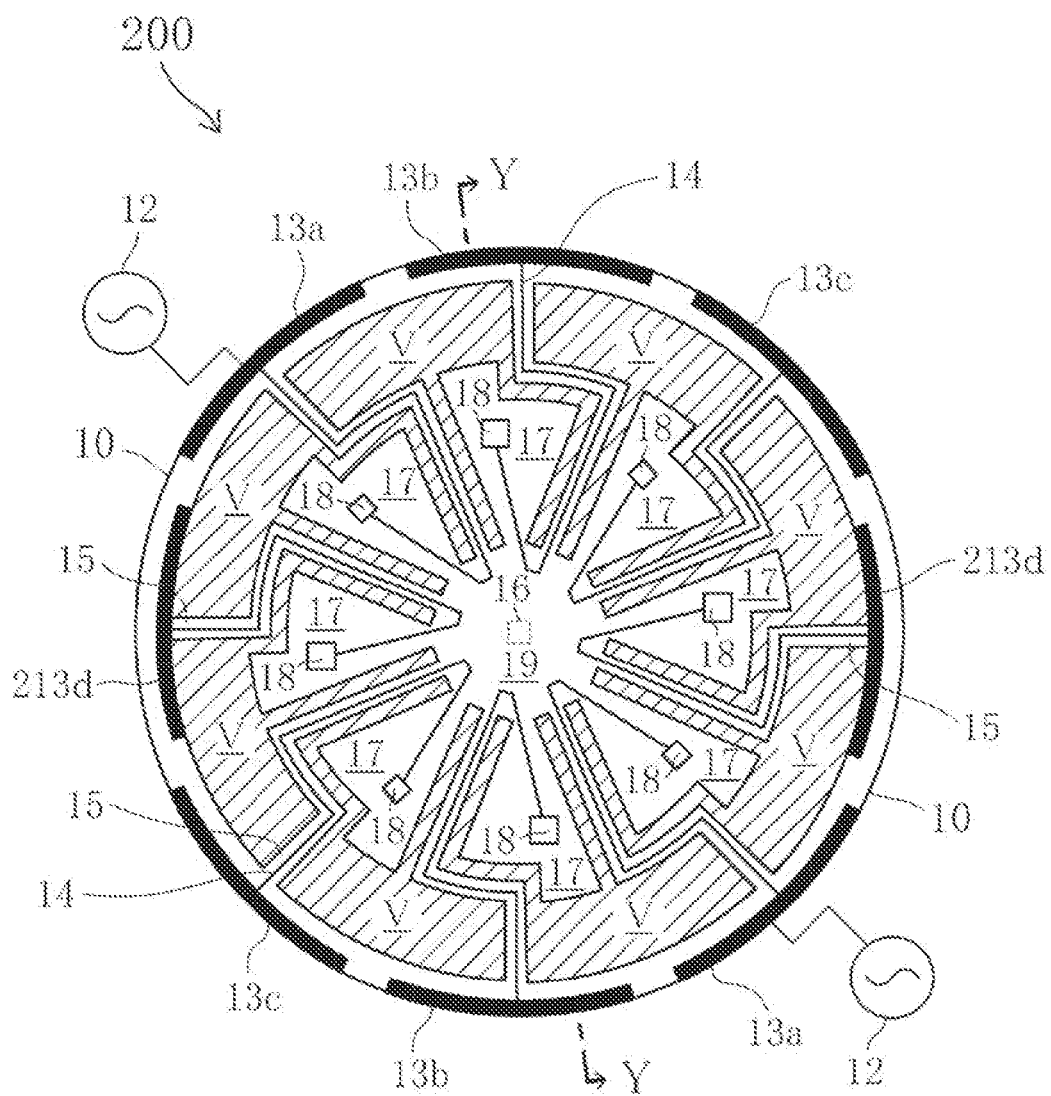
FIG. 5 is a front view of a structure having a principal function in a ring-shaped vibrating gyroscope according to another embodiment of the present invention.
Figure 6:
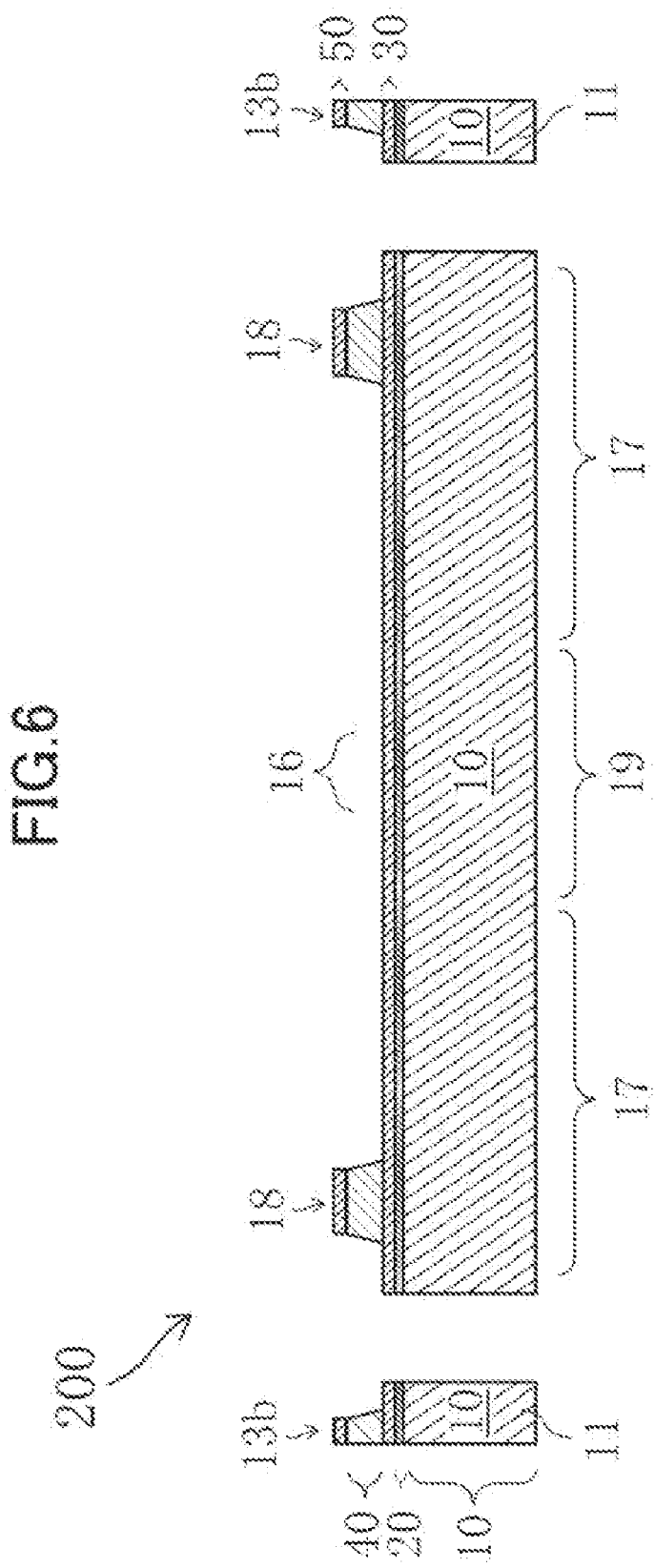
FIG. 6 is a cross sectional view taken along line Y-Y of FIG. 5.

FIG. 5 is a front view of a structure having a principal function in another ring-shaped vibrating gyroscope 200 in the present embodiment. FIG. 6 is a cross sectional view taken along line Y-Y of FIG. 5. The ring-shaped vibrating gyroscope 200 according to the present embodiment is configured identically with the ring-shaped vibrating gyroscope 100 of the first embodiment, except for the piezoelectric film 40 and the upper-layer metallic film 50 in the first embodiment. The manufacturing method therefor is identical with that of the first embodiment except for some steps. The vibration mode in the present embodiment is of cos2θ as in the first embodiment. Accordingly, the description duplicating with that of the first embodiment will not be repeatedly provided. In FIG. 5, the arithmetic circuit 60 shown in FIG. 1 is not illustrated expediently for easier comprehension of the figure.

As shown in FIGS. 5 and 6, the ring-shaped vibrating gyroscope 200 according to the present embodiment includes second detection electrodes 213d, 213d in place of the second detection electrodes 13d, 13d of the first embodiment. The outer end of the upper-layer metallic film 50 at each of the locations of the second detection electrodes 213d, 213d in the present embodiment is formed inside by approximately 1 μm with respect to the inner peripheral edge of the ring-shaped vibrating body 11, so as to be approximately 18 μm wide. The upper-layer metallic film 50 at the location of each of the electrodes is formed inside the center line in the ring-shaped plane of the ring-shaped vibrating body 11.

As shown in FIG. 6, in the present embodiment, the piezoelectric film 40 is etched in correspondence with the region where the upper-layer metallic film 50 is formed substantially. The alternating-current voltage applied to the upper-layer metallic film 50 is thus applied only in the vertically downward direction with no influence of the region formed with the lower-layer metallic film 30. Therefore prevented are undesired expansion and contraction motions of the piezoelectric film 40 as well as transmission of an electrical signal. In the present embodiment, after the step of dry etching the upper-layer metallic film 50, dry etching is subsequently performed under the condition same as that of the first embodiment with the residual resist film on the upper-layer metallic film 50 or the upper-layer metallic film 50 itself serving as an etching mask. As a result, there is formed the piezoelectric film 40 described above. Further, as shown in FIG. 6, the piezoelectric film 40 is etched so as to be inclined (at an inclination angle of 75°, for example) in the present embodiment. However, the piezoelectric film 40 steeply inclined as shown in FIG. 6 is dealt in the present application as being substantially visually unrecognized, with respect to other regions, in the front view of the ring-shaped vibrating gyroscope 200 shown in FIG. 5.

When an angular velocity is applied to the ring-shaped vibrating gyroscope 200, of which a primary vibration similar to that of the first embodiment is excited, about the perpendicular axis (in the direction perpendicular to the drawing sheet) of the ring-shaped vibrating gyroscope 200, a secondary vibration is detected by the two first detection electrodes 13b, 13b and the two second detection electrodes 213d, 213d.

As shown in FIG. 5, in the present embodiment, the first detection electrodes 13b, 13b and the second detection electrodes 213d, 213d are respectively disposed in correspondence with the vibration axis of the secondary vibration. The first detection electrodes 13b, 13b are formed outside the center line in the upper surface of the ring-shaped vibrating body 11. On the other hand, the second detection electrodes 213d, 213d are formed inside the center line in the upper surface of the ring-shaped vibrating body 11. Accordingly, identical with each other are the positive/negative polarities of the electrical signals generated by the first detection electrodes 13b, 13b and those generated by the second detection electrodes 213d, 213d due to the secondary vibration excited upon the application of the angular velocity.

Obtained in the arithmetic circuit (not shown) functioning as a known adder circuit is a sum of the electrical signals of the first detection electrodes 13b, 13b and the second detection electrodes 213d, 213d. Resulting detection signals of this case have approximately doubled detectability in comparison to the case with only the first detection signals or the second detection signals. An effect similar to that of the above adder circuit is exerted also by simply connecting the metal tracks 14, . . . , 14 from the first detection electrodes 13b, 13b and those from the second detection electrodes 213(1, 213d in place of the adder circuit. Therefore, the ring-shaped vibrating gyroscope 200 according to the present embodiment is advantageous in its significant simplification of the circuit design.

Assume a case where a disturbance is caused to excite a vibration in the rocking mode in the present embodiment. As shown in FIG. 5 for example, because the first detection electrodes 13b, 13b are disposed 180° apart from each other in the circumferential direction, reverse to each other are the expansion/contraction motions of the piezoelectric film 40 at the locations on the leg portions connected to the first detection electrodes 13b, 13b. As a result, the electrical signals of the respective first detection electrodes 13b have positive/negative polarities inverse to each other. Therefore, these electrical signals are canceled each other. The phenomenon described above is applicable to the above electrical signals of the leg portions connected to the respective second detection electrodes 213d. Consequently, the arithmetic circuit is not substantially affected by the vibration in the rocking mode.

In the present embodiment, in a case where a disturbance (impact) is caused to excite a vibration in the bounce mode, the positive/negative polarities of the electrical signals of the leg portions connected to all the electrodes for detecting a secondary vibration are identical with one another. Accordingly, when a sum of these electrical signals is obtained in the arithmetic circuit, these electrical signals are not canceled each other unlike in the case of the first embodiment. Therefore, the ring-shaped vibrating gyroscope 200 according to the present embodiment does not have resistance to an impact exciting a vibration in the bounce mode.

As described above, the ring-shaped vibrating gyroscope 200 according to the present embodiment including the two first detection electrodes 13b, 13b and the two second detection electrodes 213d, 213d has improved detectability of a second vibration.

<Third Embodiment>

Figure 7:
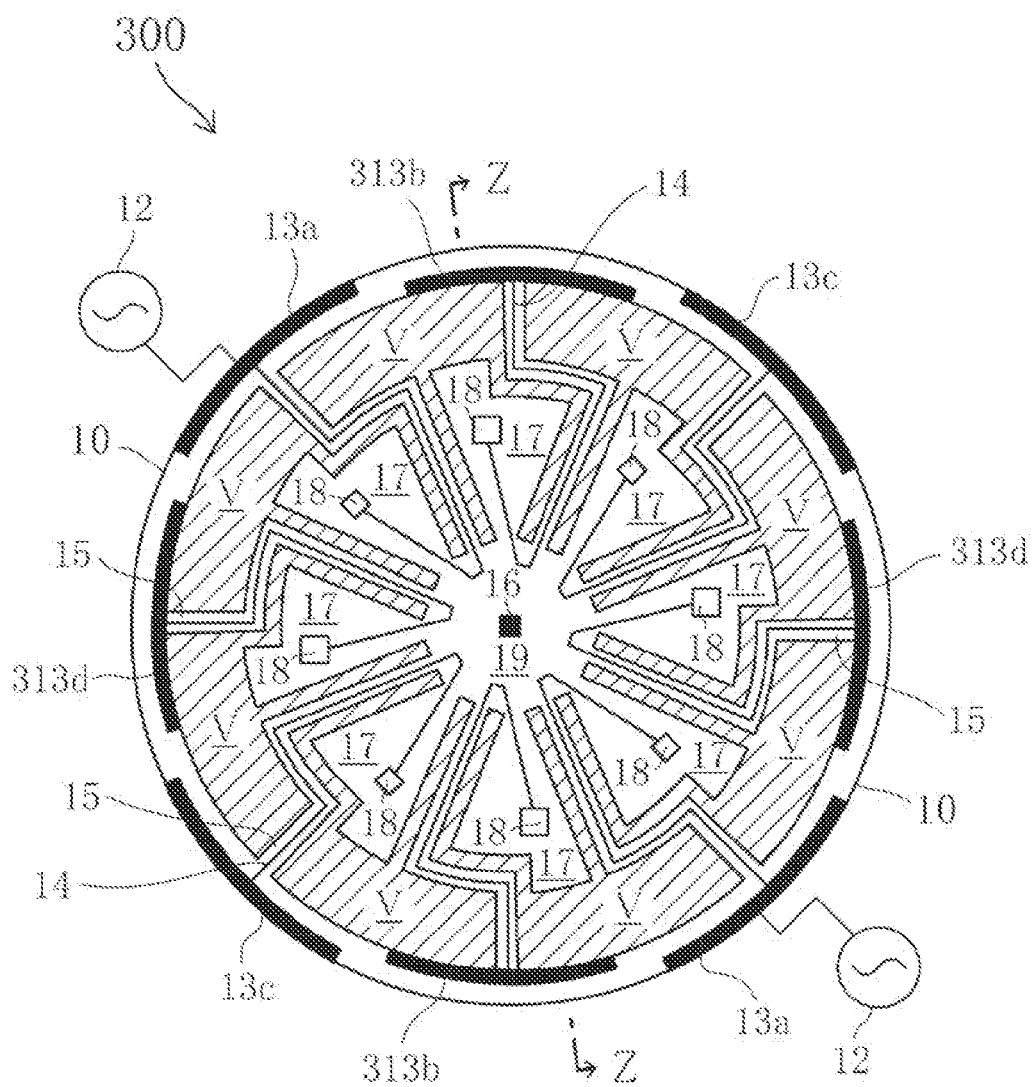
FIG. 7 is a front view of a structure having a principal function in a ring-shaped vibrating gyroscope according to still another embodiment of the present invention.
Figure 8:
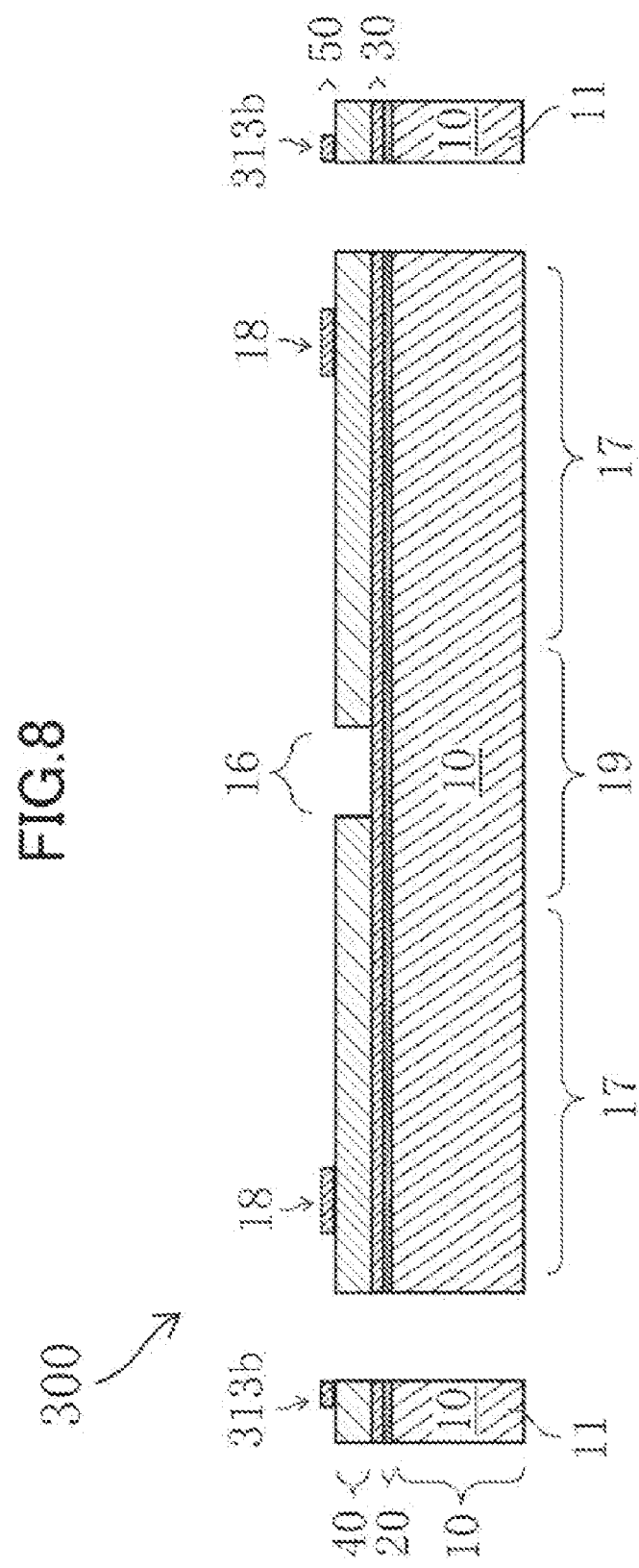
FIG. 8 is a cross sectional view taken along line Z-Z of FIG. 7.

FIG. 7 is a front view of a structure having a principal function in another ring-shaped vibrating gyroscope 300 in the present embodiment. FIG. 8 is a cross sectional view taken along line Z-Z of FIG. 7. The ring-shaped vibrating gyroscope 300 according to the present embodiment is configured identically with the ring-shaped vibrating gyroscope 100 of the first embodiment, except for disposition of the upper-layer metallic film 50 in the first region in the first embodiment. The manufacturing method therefor is identical with that of the first embodiment except for some steps. The vibration mode in the present embodiment is of cos2θ as in the first embodiment. Accordingly, the description duplicating with that of the first embodiment will not be repeatedly provided. Again in FIG. 7, the arithmetic circuit 60 shown in FIG. 1 is not illustrated expediently for easier comprehension of the figure.

As shown in FIGS. 7 and 8, the ring-shaped vibrating gyroscope 300 according to the present embodiment includes first detection electrodes 313b, 313b in place of the first detection electrodes 13b, 13b of the first embodiment, and second detection electrodes 313d, 313d in place of the second detection electrodes 13d, 13d of the first embodiment. The outer end of the upper-layer metallic film 50 at each of the locations of the first detection electrodes 313b, 313b and the second detection electrodes 313d, 313d in the present embodiment is formed inside by approximately 1 μm with respect to the inner peripheral edge of the ring-shaped vibrating body 11, so as to be approximately 18 μm wide. The upper-layer metallic film 50 at the location of each of the electrodes is formed inside the center line in the upper surface of the ring-shaped vibrating body 11.

When an angular velocity is applied to the ring-shaped vibrating gyroscope 300, of which a primary vibration similar to that of the first embodiment is excited, about the perpendicular axis (in the direction perpendicular to the drawing sheet) of the ring-shaped vibrating gyroscope 300, a secondary vibration is detected by the two first detection electrodes 313b, 313b and the two second detection electrodes 313d, 313d.

As shown in FIG. 7, in the present embodiment, the first detection electrodes 313b, 313b and the second detection electrodes 313d, 313d are respectively disposed in correspondence with the vibration axis of the secondary vibration. The first detection electrodes 313b, 313b and the second detection electrodes 313d, 313d are formed inside the center line in the upper surface of the ring-shaped vibrating body 11. Accordingly, inverse to each other are the positive/negative polarities of the electrical signals generated by the first detection electrodes 313b, 313b and those generated by the second detection electrodes 313d, 313d due to the secondary vibration excited upon the application of the angular velocity.

Then, obtained in an arithmetic circuit functioning as a known difference circuit (not shown) are differences between the electrical signals of the first detection. electrodes 313b, 313b and those of the second detection electrodes 313d, 313d. Resulting detection signals of this case have approximately doubled detectability in comparison to the case with only the first detection signals or the second detection signals.

In the present embodiment, formed on each of the leg portions 15, . . . , 15 are the upper-layer metallic film 50 which serves as the metal tracks 14, the piezoelectric film 40, and the lower-layer metallic film 30 Assume that there is generated a disturbance (impact) exciting a vibration in the bounce mode already described to the ring-shaped vibrating gyroscope 300. As the leg portions 15, . . . , 15 are shifted in one direction along the perpendicular axis of the ring-shaped vibrating gyroscope 300, there are generated electrical signals in accordance with the expansion/contraction motions of the piezoelectric film 40 at the locations on the leg portions 15, . . . , 15. However, in this case, the positive/negative polarities of the above electrical signals are identical with one another of the leg portions that are connected to all the electrodes for detecting the secondary vibration. Thus, when the arithmetic circuit described above obtains the differences therebetween, the signals from the respective leg portions 15 are substantially canceled.

On the other hand, assume a case where there is generated a disturbance exciting a vibration in the rocking mode. As shown in FIG. 7 for example, since the first detection electrodes 313b, 313b are disposed 180° apart from each other in the circumferential direction, the expansion/contraction motions of the piezoelectric film 40 at the locations on the leg portions connected to the first detection electrodes 313b, 313b are reverse to each other. As a result, the first detection electrodes 313b generate the electrical signals of positive/negative polarities inverse to each other. Accordingly, the electrical signals of these electrodes are to be canceled each other. The phenomenon described above is applicable to the above electrical signals of the leg portions connected to the respective second detection electrodes 313d. Consequently, the arithmetic circuit is not substantially affected by the vibration in the rocking mode.

As described above, because the ring-shaped vibrating gyroscope 300 according to the present embodiment includes the two first detection electrodes 313b, 313b and the two second detection electrodes 313d, 313d, improved are detectability of a secondary vibration as well as resistance to an external impact that excites a vibration in the bounce mode or in the rocking mode.

<Fourth Embodiment>

Figure 10:
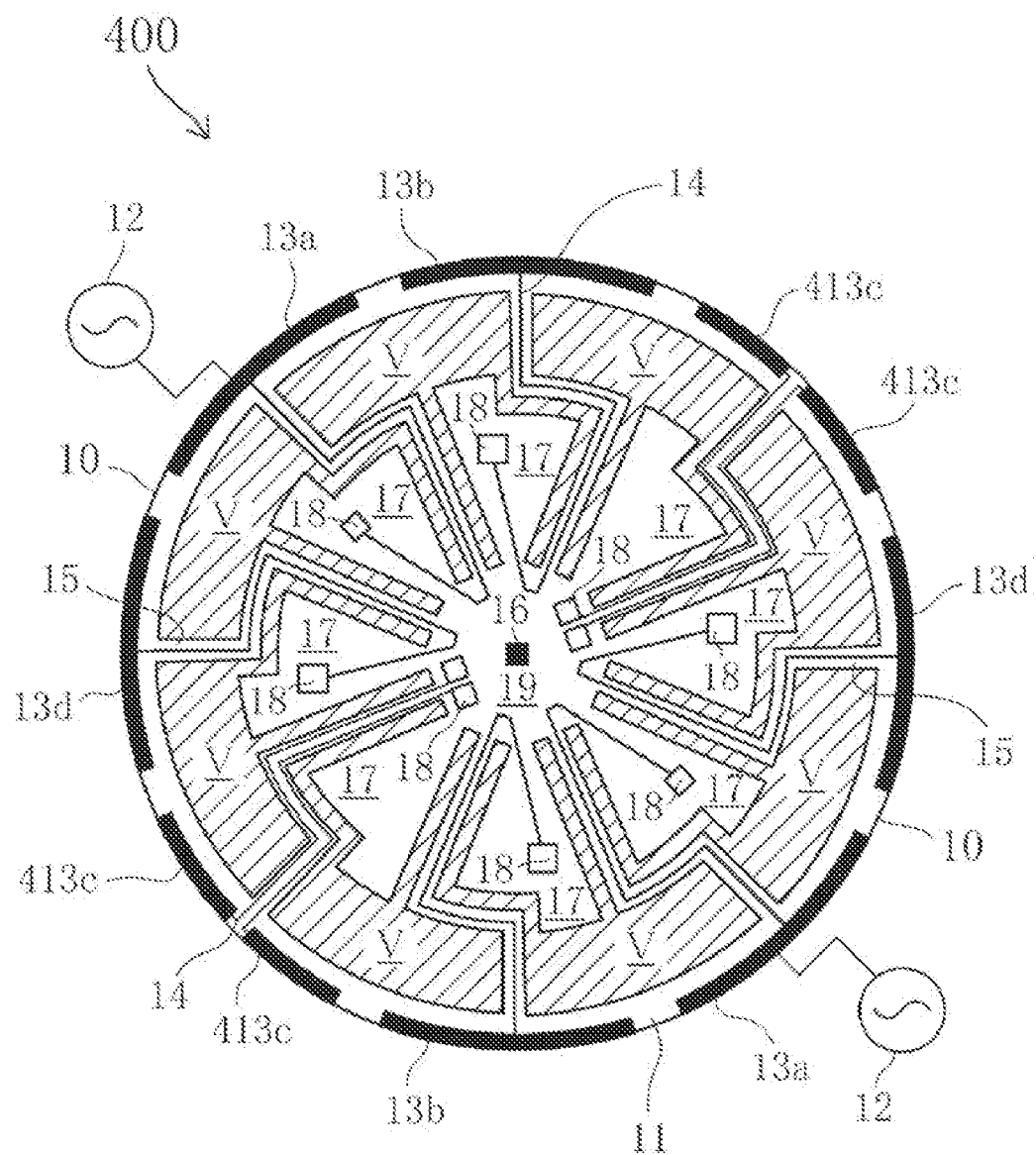
FIG. 10 is a front view of a structure having a principal function in a ring-shaped vibrating gyroscope according to further another embodiment of the present invention.

FIG. 10 is a front view of a structure having a principal function in another ring-shaped vibrating gyroscope 400 in the present embodiment. The ring-shaped vibrating gyroscope 400 according to the present embodiment is configured identically with the ring-shaped vibrating gyroscope 100 of the first embodiment, except for disposition of the upper-layer metallic film 50 in the first region relating to the monitor electrodes in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 10, the arithmetic circuit 60 is not illustrated expediently for easier comprehension of the figure.

As shown in FIG. 10, the ring-shaped vibrating gyroscope 400 according to the present embodiment includes four monitor electrodes 413c, . . . , 413c, which are connected respectively with the electrode pads 18, . . . , 18 by way of the metal tracks. As in the first embodiment, each of these monitor electrodes 413c, . . . , 413c detects an amplitude and a resonant frequency of a primary vibration of the ring-shaped vibrating body 11, and transmits a signal to a known feedback control circuit (not shown). As a result, the ring-shaped vibrating body 11 is vibrated constantly and continuously.

As shown in FIG. 10, the monitor electrodes 413c, ..., 413c are not necessarily disposed (180/2)°, namely, 90°, apart respectively from the driving electrodes 13a, 13a. The main effect of the present invention is exerted even with the disposition of the monitor electrodes 413c, ..., 413c shown in FIG. 10. In the present embodiment, the monitor electrodes 413c, ..., 413c are disposed apart respectively from the driving electrodes 13a, 13a at equal angles around 90°. Accordingly decreased is the influence of unevenness in the detection sensitivity due to displacements of the monitor electrodes 413c, ..., 413c which are caused by variations in the manufacturing steps. Moreover, since outputs in reverse phases by the secondary vibration of the ring-shaped vibrating body 11 suppress each other, it is possible to constantly maintain the magnitude of the primary vibration without being affected by a secondary vibration that is newly generated.

<Fifth Embodiment>

Figure 11:
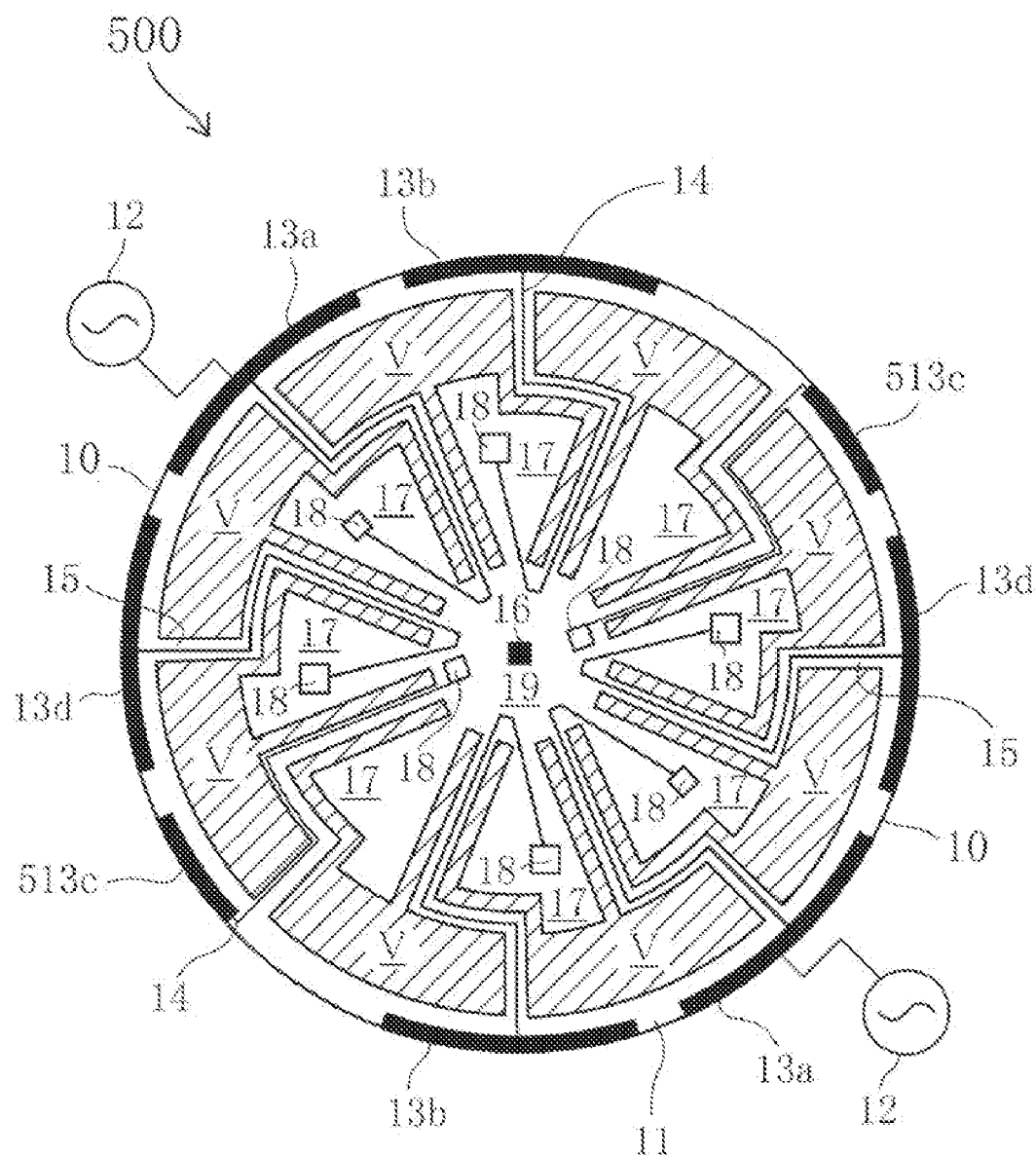
FIG. 11 is a front view of a structure having a principal function in a ring-shaped vibrating gyroscope according to a still different embodiment of the present invention.

FIG. 11 is a front view of a structure having a principal function in another ring-shaped vibrating gyroscope 500 in the present embodiment. The ring-shaped vibrating gyroscope 500 according to the present embodiment is configured identically with the ring-shaped vibrating gyroscope 100 of the first embodiment, except for disposition of the upper-layer metallic film 50 in the first region in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 11, the arithmetic circuit 60 is not illustrated expediently for easier comprehension of the figure.

As shown in FIG. 11, the ring-shaped vibrating gyroscope 500 according to the present embodiment includes two monitor electrodes 513c, 513c, which are connected respectively with the electrode pads 18, 18 by way of the metal tracks. As in the first embodiment, each of these monitor electrodes 513c, 513c detects an amplitude and a resonant frequency of a primary vibration of the ring-shaped vibrating body 11, and transmits a signal to a known feedback control circuit (not shown). As a result, the ring-shaped vibrating body 11 is vibrated constantly and continuously.

As shown in FIG. 11, the monitor electrodes 513c, 513c are not necessarily disposed (180/2)°, namely, 90°, apart respectively from the driving electrodes 13a, 13a. The main effect of the present invention is exerted even with the disposition of the monitor electrodes 513c, 513c shown in FIG. 11. In the present embodiment, the monitor electrodes 513c, 513c are disposed apart counterclockwise from the driving electrodes 13a, 13a respectively at equal angles around 90°. Accordingly decreased is the influence of unevenness in the detection sensitivity due to displacements of the monitor electrodes 513; 513c, which are caused by variations in the manufacturing steps. There is exerted an effect similar to the above even in a case where the monitor electrodes 513c, 513c are disposed apart clockwise from the driving electrodes 13a, 13a respectively at equal angles around 90°.

<Sixth Embodiment>

Figure 12:
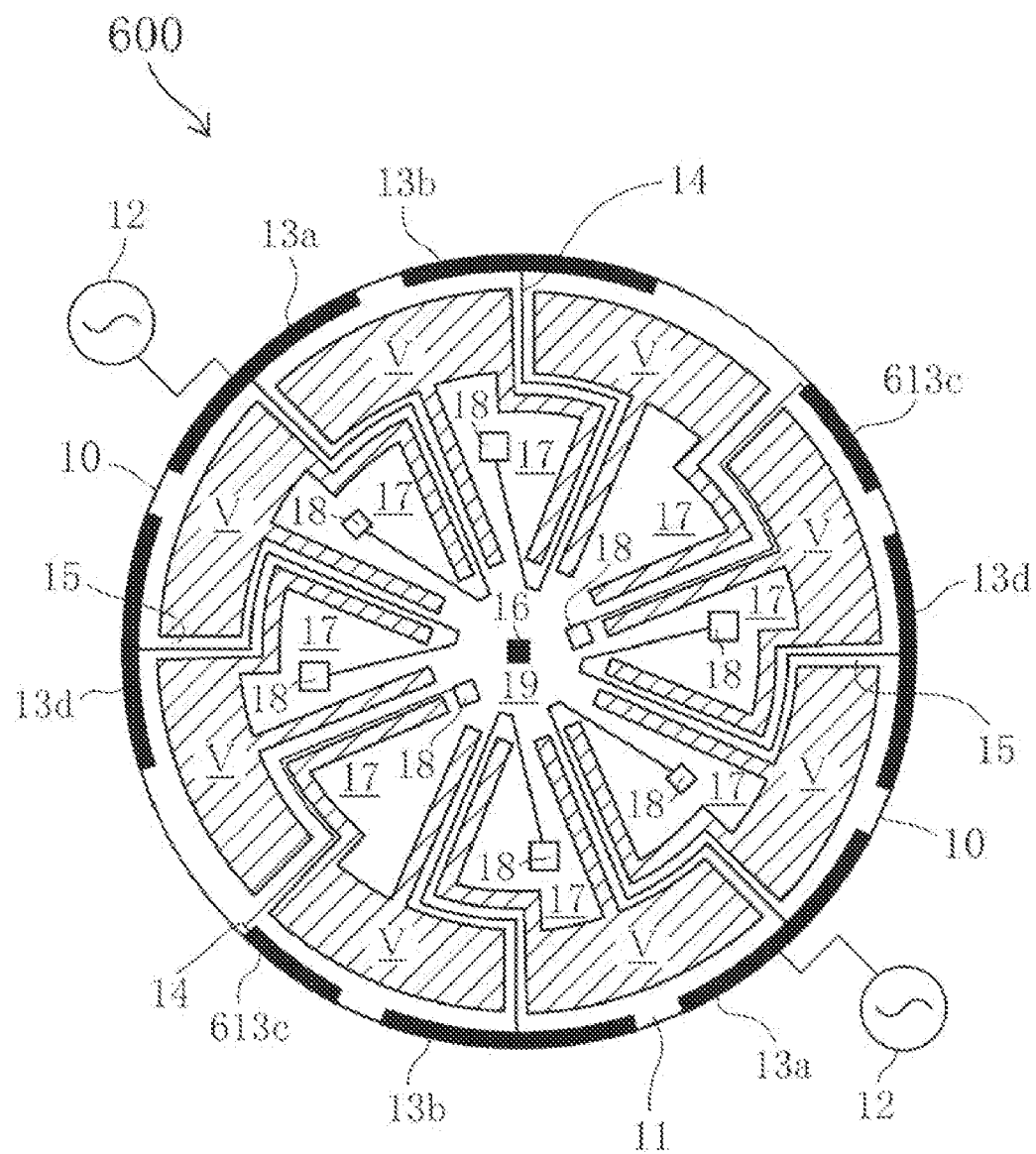
FIG. 12 is a front view of a structure having a principal function in a ring-shaped vibrating gyroscope according to a still different embodiment of the present invention.

FIG. 12 is a front view of a structure having a principal function in another ring-shaped vibrating gyroscope 600 in the present embodiment. The ring-shaped vibrating gyroscope 600 according to the present embodiment is configured identically with the ring-shaped vibrating gyroscope 100 of the first embodiment, except for disposition of the upper-layer metallic film 50 in the first region in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 12, the arithmetic circuit 60 is not illustrated expediently for easier comprehension of the figure.

As shown in FIG. 12, the ring-shaped vibrating gyroscope 600 according to the present embodiment includes two monitor electrodes 613c, 613c, which are connected respectively with the electrode pads 18, 18 by way of the metal tracks. As in the first embodiment, each of these monitor electrodes 613c, 613c detects an amplitude and a resonant frequency of a primary vibration of the ring-shaped vibrating body 11, and transmits a signal to a known feedback control circuit (not shown). As a result, the ring-shaped vibrating body 11 is vibrated constantly and continuously.

As shown in FIG. 12, the monitor electrodes 613c, 613c are not necessarily disposed (180/2)°, namely, 90°, apart respectively from the driving electrodes 13a, 13a. The main effect of the present invention is exerted even with the disposition of the monitor electrodes 613c, 613c shown in FIG. 12. In the present embodiment, the monitor electrodes 613c, 613c are disposed apart counterclockwise and clockwise, respectively, from the driving electrodes 13a, 13a at equal angles around 90°. As a result, since outputs in reverse phases by the secondary vibration of the ring-shaped vibrating body 11 suppress each other, it is possible to constantly maintain the magnitude of the primary vibration without being affected by a secondary vibration that is newly generated.

<Seventh Embodiment>

Figure 13A:
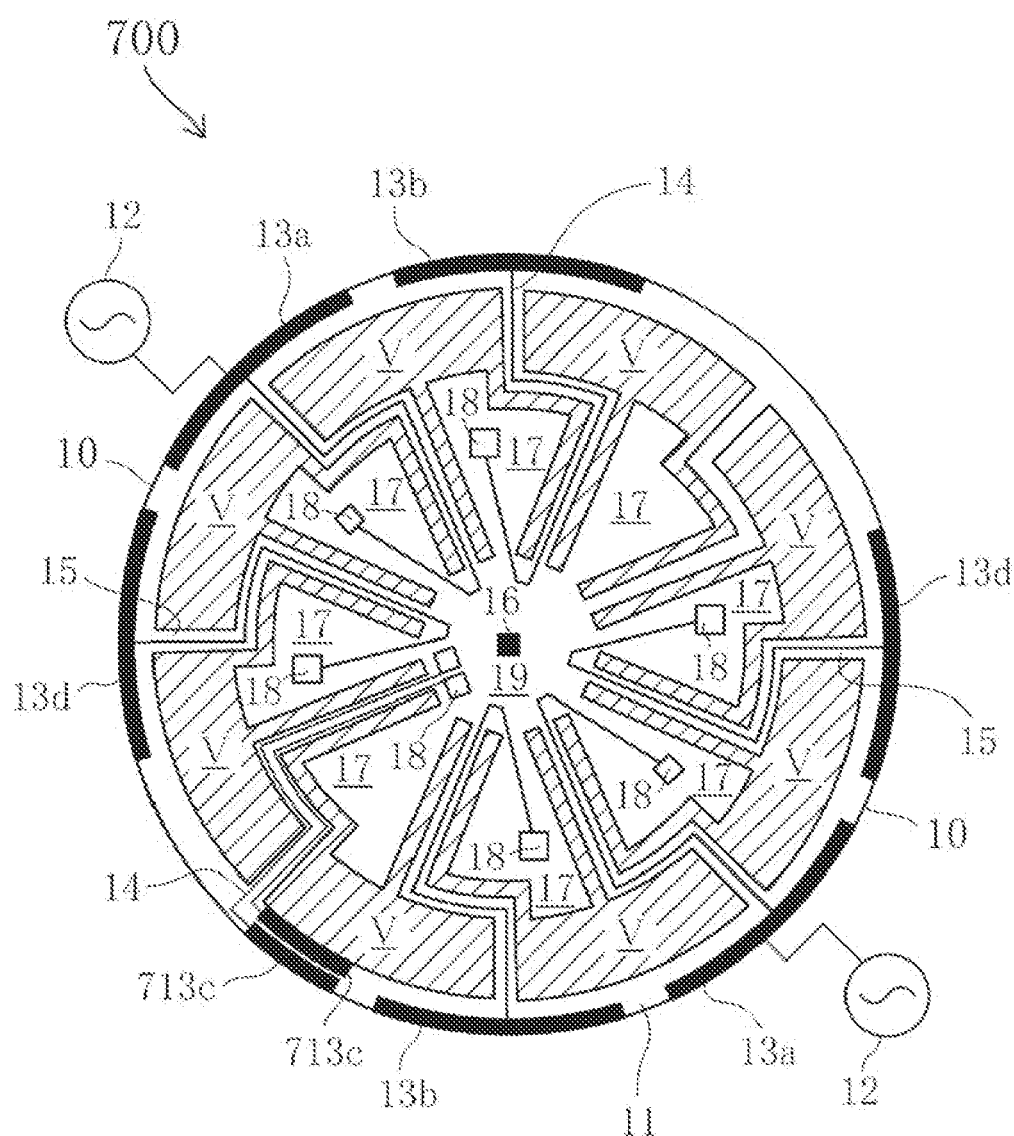
FIG. 13A is a front view of a structure having a principal function in a ring-shaped vibrating gyroscope according to a still different embodiment of the present invention.

FIG. 13A is a front view of a structure having a principal function in another ring-shaped vibrating gyroscope 700 in the present embodiment. The ring-shaped vibrating gyroscope 700 according to the present embodiment is configured identically with the ring-shaped vibrating gyroscope 100 of the first embodiment, except for disposition of the upper-layer metallic film 50 in the first region in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 13A, the arithmetic circuit 60 is not illustrated expediently for easier comprehension of the figure.

As shown in FIG. 13A, the ring-shaped vibrating gyroscope 700 according to the present embodiment includes two monitor electrodes 713c, 713c, which are connected respectively with the electrode pads 18, 18 by way of the metal tracks. As in the first embodiment, each of these monitor electrodes 713c, 713c detects an amplitude and a resonant frequency of a primary vibration of the ring-shaped vibrating body 11, and transmits a signal to a known feedback control circuit (not shown). As a result, the ring-shaped vibrating body 11 is vibrated constantly and continuously.

As shown in FIG. 13A, the monitor electrodes 713c, 713c are not necessarily disposed (180/2)°, namely, 90°, apart respectively from the driving electrodes 13a, 13a. The main effect of the present invention is exerted even with the disposition of the monitor electrodes 713c, 713c shown in FIG. 13A. In the present embodiment, the monitor electrodes 713c, 713c are disposed apart counterclockwise from the driving electrodes 13a, 13a respectively at equal angles around 90°.

Accordingly decreased is the influence of unevenness in the detection sensitivity due to displacements of the monitor electrodes 713c, 713c, which are caused by variations in the manufacturing steps. There is exerted an effect similar to the above even in a case where the monitor electrodes 713c, 713c are disposed apart clockwise from the driving electrodes 13a, 13a respectively at equal angles around 90°.

<Modification of Seventh Embodiments>

Figure 13B:
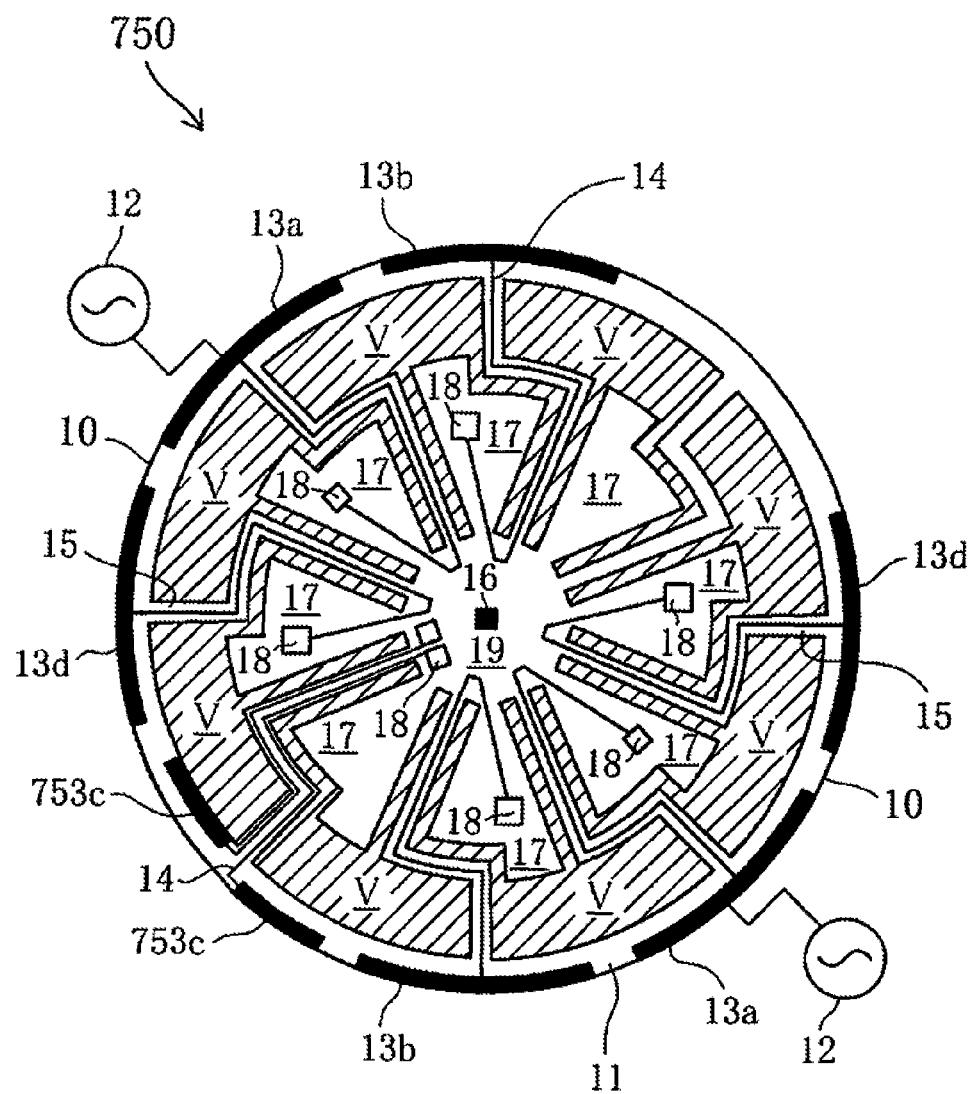
FIG. 13B is a front view of a structure having a principal function in a ring-shaped vibrating gyroscope according to a still different embodiment of the present invention.

FIG. 13B is a front view of a structure having a principal function in another ring-shaped vibrating gyroscope 750 in the present embodiment. The ring-shaped vibrating gyroscope 750 according to the present embodiment is configured identically with the ring-shaped vibrating gyroscope 100 of the first embodiment, except for disposition of the upper-layer metallic film 50 in the first region in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 13B, the arithmetic circuit 60 is not illustrated expediently for easier comprehension of the figure.

As shown in FIG. 13B, the ring-shaped vibrating gyroscope 750 according to the present embodiment includes two monitor electrodes 753c, 753c, which are connected respectively with the electrode pads 18, 18 by way of the metal tracks. As in the first embodiment, each of these monitor electrodes 753c, 753c detects an amplitude and a resonant frequency of a primary vibration of the ring-shaped vibrating body 11, and transmits a signal to a known feedback control circuit (not shown). As a result, the ring-shaped vibrating body 11 is vibrated constantly and continuously.

As shown in FIG. 13B, the monitor electrodes 753c, 753c are not necessarily disposed (180/2)°, namely, 90°, apart respectively from the driving electrodes 13a, 13a. The main effect of the present invention is exerted even with the disposition of the monitor electrodes 753c, 753c shown in FIG. 13B. In the present embodiment, one of the monitor electrodes 753c, 753c on the outer peripheral edge of the ring-shaped vibrating body 11 is disposed apart counterclockwise from the corresponding one of the driving electrodes 13a, and the other monitor electrode 753c on the inner peripheral edge of the ring-shaped vibrating body 11 is disposed apart clockwise from the corresponding driving electrode 13a, at equal angles around 90°. Accordingly decreased is the influence of unevenness in the detection sensitivity due to displacements of the monitor electrodes 753c, 753c, which are caused by variations in the manufacturing steps.

<Eighth Embodiment>

Figure 14:
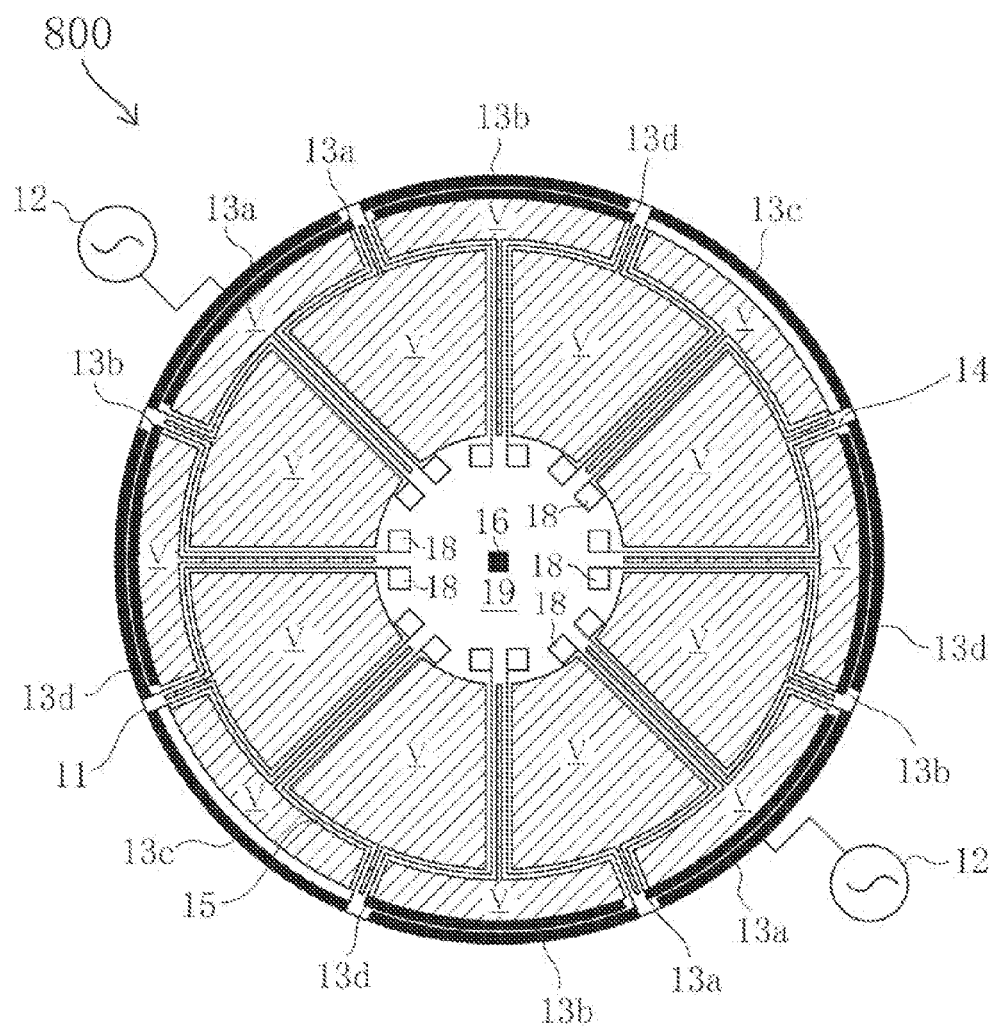
FIG. 14 is a front view of a structure having a principal function in a ring-shaped vibrating gyroscope according to a still different embodiment of the present invention.

FIG. 14 is a front view of a structure having a principal function in another ring-shaped vibrating gyroscope 800 in the present embodiment. The ring-shaped vibrating gyroscope 800 according to the present embodiment is configured identically with the ring-shaped vibrating gyroscope 100 of the first embodiment, except for disposition of the leg portions 15, . . . , 15 and disposition of the upper-layer metallic film 50 in the first region in the first embodiment. The manufacturing method therefor is identical with that of the first embodiment except for a pattern formed in accordance with the photolithographic technique. The vibration mode in the present embodiment is of cos2θ as in the first embodiment. Accordingly, the description duplicating with that of the first embodiment will not be repeatedly provided. Also in FIG. 14, the arithmetic circuit 60 is not illustrated expediently for easier comprehension of the figure.

As shown in FIG. 14, in the ring-shaped vibrating gyroscope 800 according to the present embodiment, the driving electrodes 13a, . . . , 13a, the first detection electrodes 13b, 13b, and the second detection electrodes 13d, . . . , 13d are respectively disposed in a region from the outer peripheral edge of the ring-shaped vibrating body 11 to the vicinity of the outer peripheral edge or in a region from the inner peripheral edge thereof to the vicinity of the inner peripheral edge. The monitor electrodes 13c, 13c are respectively disposed in the region from the outer peripheral edge of the ring-shaped vibrating body 11 to the vicinity of the outer peripheral edge. In the present embodiment, the phase of the drive voltage applied to each of the driving electrodes 13a, 13a that are disposed in the region from the outer peripheral edge of the ring-shaped vibrating body 11 to the vicinity of the outer peripheral edge is reverse to the phase of the drive voltage applied to each of the driving electrodes 13a, 13a that are disposed in the region from the inner peripheral edge thereof to the vicinity of the inner peripheral edge. The phase detected by each of the first detection electrodes 13b, 13b that are disposed in the region from the outer peripheral edge of the ring-shaped vibrating body 11 to the vicinity of the outer peripheral edge is identical with the phase detected by each of the first detection electrodes 13b, 13b that are disposed in the region from the inner peripheral edge thereof to the vicinity of the inner peripheral edge. The phase detected by each of the second detection electrodes 13d, 13d that are disposed in the region from the outer peripheral edge of the ring-shaped vibrating body 11 to the vicinity of the outer peripheral edge is identical with the phase detected by each of the second detection electrodes 13d, 13d that are disposed in the region from the inner peripheral edge thereof to the vicinity of the inner peripheral edge. However, the phase of each of the first detection electrodes 13b is reverse to the phase of each of the second detection electrodes 13d.

Even in a case of the present embodiment where the respective types of electrodes are disposed in the region from the outer peripheral edge of the ring-shaped vibrating body 11 to the vicinity of the outer peripheral edge as well as in the region from the inner peripheral edge thereof to the vicinity of the inner peripheral edge, there is exerted an effect similar to that of the present invention. Particularly when these electrodes are disposed in the region from the outer peripheral edge of the ring-shaped vibrating body 11 to the vicinity of the outer peripheral edge as well as in the region from the inner peripheral edge thereof to the vicinity of the inner peripheral edge, the driving power as well as the detectability of a secondary vibration of the ring-shaped vibrating body 11 are doubled in spite of somewhat complicated disposition of the respective types of electrodes. Therefore, the ring-shaped vibrating gyroscope 800 according to the present embodiment is regarded as one of the preferable aspects.

Furthermore, even in a case where some or all of the monitor electrodes 13c, 13c of the ring-shaped vibrating gyroscope 800 in the present embodiment are disposed as in any one of the fourth to eighth embodiments, there is exerted an effect similar to the effect of the one of the fourth to eighth embodiments.

<Ninth Embodiment>

Figure 15A:
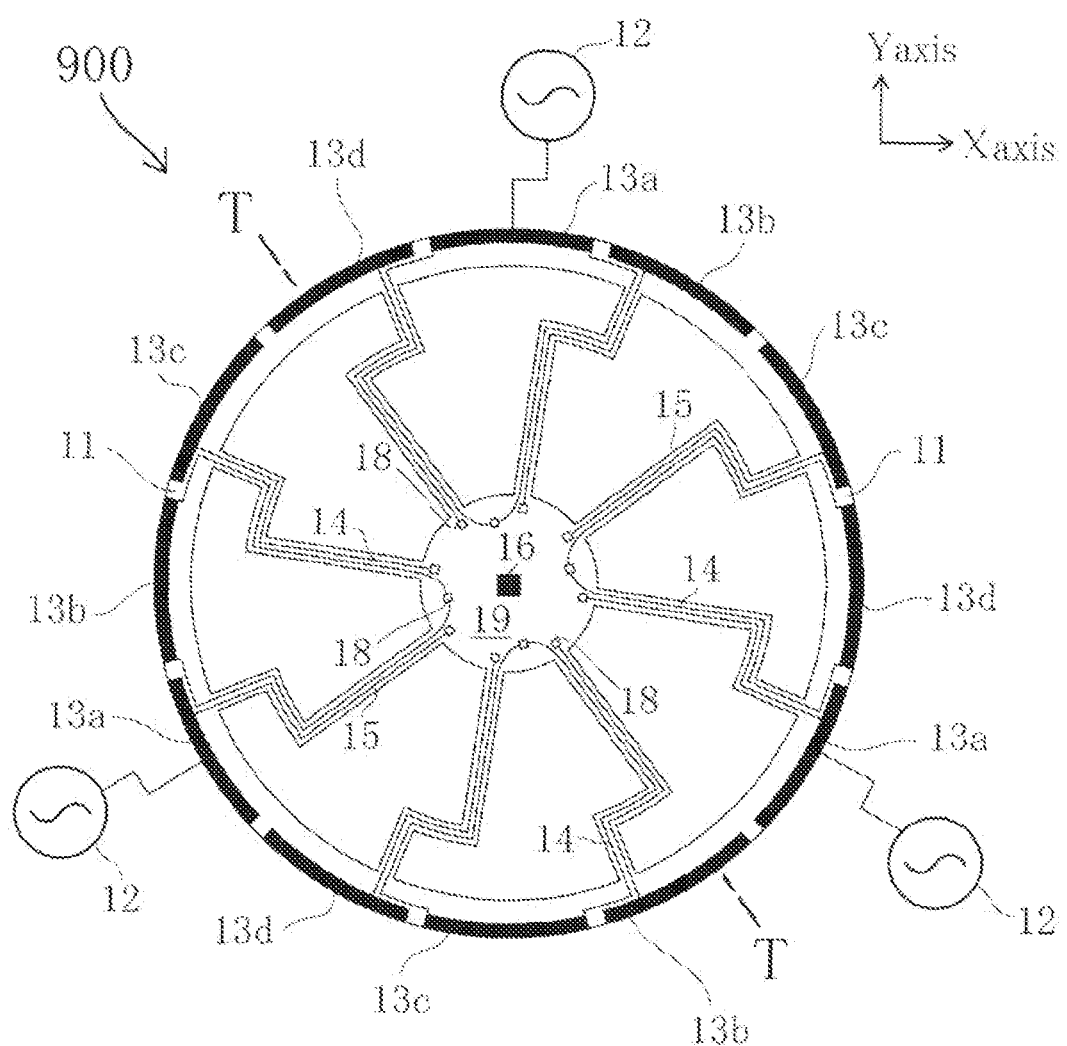
FIG. 15A is a front view of a structure having a principal function in a ring-shaped vibrating gyroscope according to a still different embodiment of the present invention.
Figure 15B:
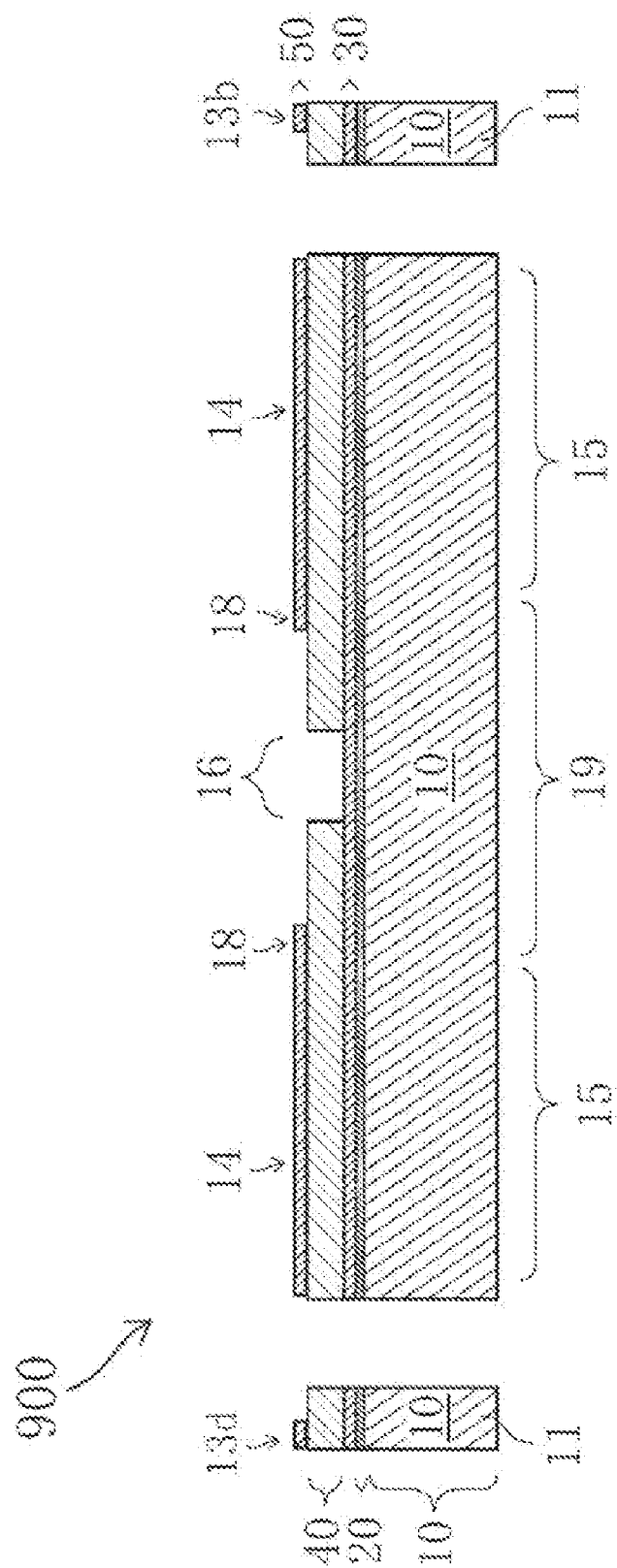
FIG. 15B is a cross sectional view taken along line T-T of FIG. 15A.

FIG. 15A is a front view of a structure having a principal function in another ring-shaped vibrating gyroscope 900 in the present embodiment. FIG. 15B is a cross sectional view taken along line T-T of FIG. 15A. The ring-shaped vibrating gyroscope 900 according to the present embodiment is configured substantially identically with the ring-shaped vibrating gyroscope 100 of the first embodiment, except for disposition of the upper-layer metallic film 50 in the first region as well as the electrode pad fixed ends 17, . . . , 17 in the first embodiment. The manufacturing method therefor is identical with that of the first embodiment except for respective types of patterns formed in accordance with the photolithographic technique. The vibration mode in the present embodiment is of cos3θ unlike in the first embodiment. Accordingly, the description duplicating with that of the first embodiment will not be repeatedly provided. In FIG. 15A, the arithmetic circuit is not illustrated expediently for easier comprehension of the figure. For the purpose of easier illustration, an X axis and a Y axis are indicated in FIG. 15A. Moreover, in the present embodiment, there are not shown the diagonal lines and the letters of V, which appear in the figures of the other embodiments.

As shown in FIG. 15A, each portion of the upper-layer metallic film 50 of the ring-shaped vibrating gyroscope 900 is formed outside the center line in the present embodiment.

Figure 16A:
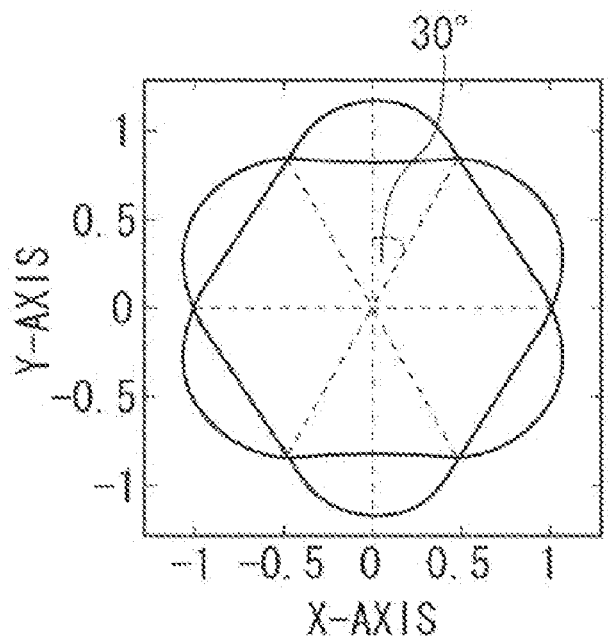
FIG. 16A is a graph conceptually indicating a primary vibration in a vibration mode of $\cos 3\theta$ according to a different embodiment of the present invention.
Figure 16B:
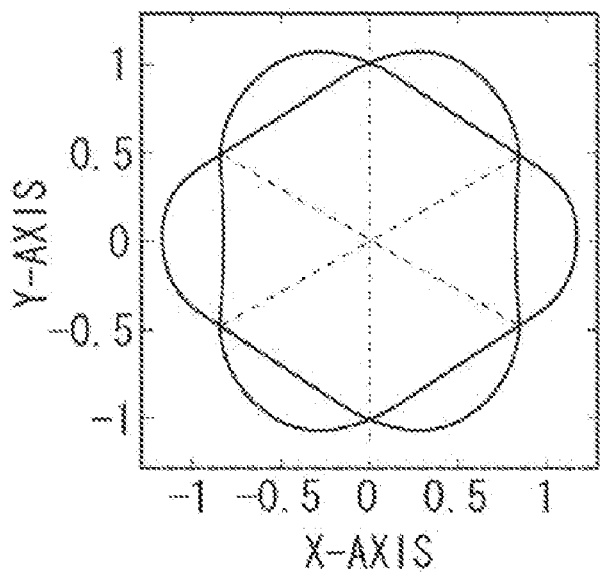
FIG. 16B is a graph conceptually indicating a secondary vibration in the vibration mode of $\cos 3\theta$ according to a different embodiment of the present invention.

The primary vibration in the present embodiment has the in-plane vibration mode of cos3θ as indicated in FIG. 16A. The secondary vibration in the present embodiment has the in-plane vibration mode of cos3θ as indicated in FIG. 16B. Accordingly, the plurality of electrodes 13a to 13e are categorized as follows. Firstly, there are three driving electrodes 13a, 13a, 13a disposed 120° apart from each other in the circumferential direction. In a case where one of the above three driving electrodes 13a, 13a (for example, the driving electrode 13a disposed in the direction of twelve o'clock in FIG. 15A) is set as a reference electrode, the monitor electrodes 13; 13c, 13c are disposed 60°, 180°, and 300° respectively apart clockwise from the reference electrode in the circumferential direction. The first detection electrodes 13b, 13b, 13b are disposed 30°, 150°, and 270° respectively apart clockwise from the reference electrode in the circumferential direction. In addition, the second detection electrodes 13d, 13d, 13d are disposed 90°, 210°, and 330° respectively apart clockwise from the reference electrode in the circumferential direction.

As shown in FIG. 15A, in the present embodiment, the metal tracks 14, 14 are provided from both ends of each of the respective types of electrodes so as to eliminate variations in electrical signals. The function of the vibrating gyroscope is not affected even in a case where the metal track 14 is provided only from one of the ends of each of the respective types of electrodes.

The third region in the present embodiment includes the post 19 formed with the silicon substrate 10 that is provided continuously to the portions of the leg portions 15, . . . , 15 described above. In the present embodiment, the post 19 also serves as the electrode pad fixed ends 17 in the first embodiment. Formed on the upper surface of the post 19 are the silicon oxide film 20, the lower-layer metallic film 30, and the piezoelectric film 40 described above, which are provided continuously to the portions of the respective films on the leg portions 15, . . . , 15. except for the portion of the fixed potential electrode 16 that functions as the ground electrode. In this case, the lower-layer metallic film 30 formed on the silicon oxide film 20 functions as the fixed potential electrode 16. On the upper surface of the piezoelectric film 40 formed above the post 19, there are formed the metal tracks 14, . . . , 14 as well as the electrode pads 18, . . . , 18 which are provided continuously to the portions of the metal tracks on the leg portions 15, . . . , 15.

Described next is the operation of each of the electrodes included in the ring-shaped vibrating gyroscope 900. As described above, in the present embodiment, excited is the primary vibration in the in-plane vibration mode of cos3θ. As the fixed potential electrode 16 is grounded, the lower-layer metallic film 30 formed continuously to the portion of the fixed potential electrode 16 is uniformly set to 0 V.

Firstly applied to each of the three driving electrodes 13a, 13a, 13a is an alternating-current voltage of 1 $V_{P\text{-}0}$. As a result, the piezoelectric film 40 is expanded and contracted to excite a primary vibration. In the present embodiment, the upper-layer metallic film 50 is formed outside the center line in the upper surface of the ring-shaped vibrating body 11, it is possible to convert the expansion/contraction motions of the piezoelectric film 40 into the primary vibration of the ring-shaped vibrating body 11 with no upper-layer metallic film 50 being formed on a side surface of the ring-shaped vibrating body 11. Actual alternating-current power supplies 12 each apply to the corresponding driving electrode 13a by way of the corresponding electrode pad 18 that is connected to a conductive wire. However, the alternating-current power supplies 12 are not referred to in the present embodiment and in the other embodiments, for the purpose of easier illustration.

Then, each of the monitor electrodes 13c, 13c, 13c shown in FIG. 15A detects an amplitude and a resonant frequency of the above primary vibration, and transmits a signal to a known feedback control circuit (not shown). The feedback control circuit in the present embodiment controls using the signals from the monitor electrodes 13c, 13c, 13c such that the frequency of the alternating-current voltage applied to each of the driving electrodes 13a, 13a, 13a is equal to the natural frequency of the ring-shaped vibrating body 11, as well as such that the amplitude of the ring-shaped vibrating body 11 has a constant value. As a result, the ring-shaped vibrating body 11 is vibrated constantly and continuously.

When an angular velocity is applied to the ring-shaped vibrating gyroscope 900 about a perpendicular axis (in the direction perpendicular to the drawing sheet, that is, an X-Y plane) of the ring-shaped vibrating gyroscope 900, in the present embodiment in the in-plane vibration mode of cos3θ, caused by a coriolis force is a secondary vibration shown in FIG. 16B, which has a new vibration axis inclined at 30° into either side from the vibration axis of the primary vibration shown in FIG. 16A.

This secondary vibration is detected by the three first detection electrodes 13b, 13b, 13b as well as by the three second detection electrodes 13d, 13d, 13d. Also in the present embodiment, similarly to the first embodiment, the difference between the electrical signal of each of the first detection electrodes 13b and that of each of the second detection electrodes 13d is obtained in the known arithmetic circuit that functions as a difference circuit. Resulting detection signals of this case have approximately doubled detectability in comparison to the case with only one type of the detection signals.

As described above, in the ring-shaped vibrating gyroscope 900 according to the present embodiment including the first detection electrodes 13b and the second detection electrodes 13d, improved are detectability of a secondary vibration as well as resistance to an external impact that excites a vibration in the bounce mode or in the rocking mode, even in the vibration mode of cos3θ.

Even in a case where some or all of the monitor electrodes 13c, 13c, 13c of the ring-shaped vibrating gyroscope 900 according to the present embodiment are disposed as in any one of the fourth to eighth embodiments, there is exerted an effect similar to the effect of the one of the fourth to eighth embodiments.

In each of the first and third embodiments described above, the piezoelectric film 40 is not etched but the respective electrodes are formed by patterning the upper-layer metallic film 50. However, these embodiments are not limited to such a case. Also in the first or third embodiment, similarly to the second embodiment, if the piezoelectric film 40 is etched in correspondence with the region where the upper-layer metallic film 50 is substantially formed, prevented are undesired expansion and contraction motions of the piezoelectric film 40 as well as transmission of an electrical signal.

In each of the above embodiments, the silicon oxide film is provided as an insulative film on the silicon substrate. However, these embodiments are not limited to this case. There is exerted an effect substantially similar to that of the present invention even in such a case where a silicon nitride film or a silicon oxide/nitride film is formed in place of the silicon oxide film.

The vibration mode of $\cos 2\theta$ is adopted in each of the above first to eighth embodiments. However, these embodiments are not limited to this case. There is exerted an effect substantially similar to that of the present invention by adopting, when N is a natural number of 2 or more, a driving electrode that excites a primary vibration of the ring-shaped vibrating body in a vibration mode of $\cos N\theta$. For example, the disposition of the respective electrodes in the ninth embodiment, where the vibration mode of $\cos 3\theta$ is adopted, will be regarded by those skilled in the art as adequately disclosing the disposition of the respective electrodes in the vibration mode of $\cos 3\theta$ in each of the above first to eighth embodiments. In other words, when N is a natural number of 2 or more, the disposition of the respective electrodes in the vibration mode of $\cos N\theta$ should be adequately disclosed by the description in each of the above embodiments.

Figure 17:
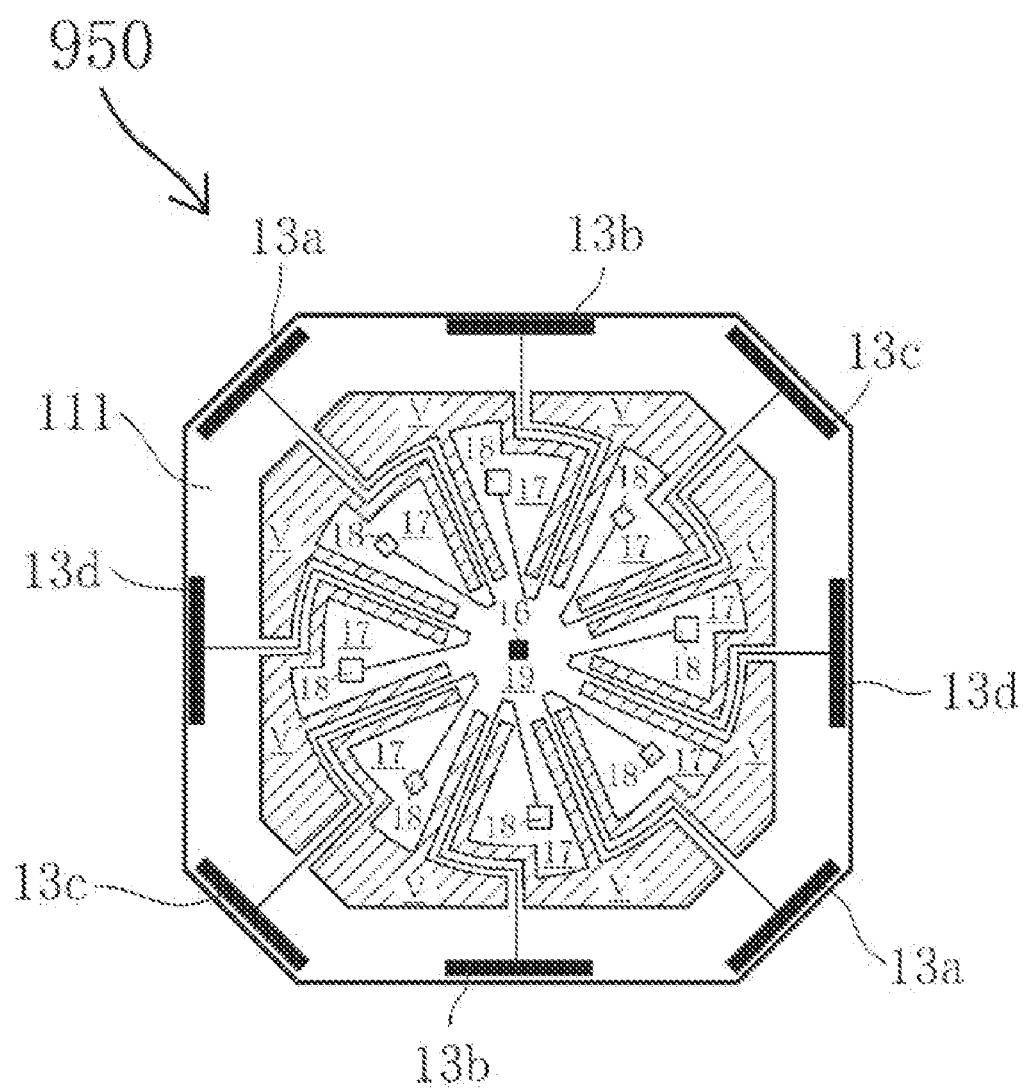
FIG. 17 is a view illustrating a shape of a vibrating body according to a still different embodiment of the present invention.

Each of the embodiments described above refers to the vibrating gyroscope using the ring-shaped vibrating body. However, the ring-shaped vibrating body may be replaced with a polygonal vibrating body. There is exerted an effect substantially similar to that of the present invention even with use of a vibrating body in a regular polygonal shape such as a regular hexagonal shape, a regular octagonal shape, a regular dodecagonal shape, a regular icosagonal shape, or the like. Further alternatively, there may be adopted a vibrating body such as an octagonal vibrating body 111 of a ring-shaped vibrating gyroscope 950 shown in FIG. 17. It is preferable, in view of stability of the vibrating body during the vibration motion, to adopt a vibrating body in a polygonal shape that is symmetrical with respect to a point in a front view of the vibrating body. It is noted that the "ring shape" is inclusive of an elliptical shape.

Moreover, adopted in each of the embodiments described above is the ring-shaped vibrating gyroscope that is mainly made of silicon. However, these embodiments are not limited to such a case. Alternatively, the main material for the vibrating gyroscope may be germanium or silicon germanium, for example. In the above examples, it is possible to apply the known anisotropic dry etching technique by particularly adopting silicon or silicon germanium, which results in significant contribution to the improvement in processing accuracy of the entire gyroscope including the vibrating body. As having been described so far, modifications made within the scope of the present invention will be also included in the scope of the patent claims.

INDUSTRIAL APPLICABILITY

The present invention is applicable, as a vibrating gyroscope, to portions of various types of devices.

The invention claimed is:

1. A vibrating gyroscope comprising:
a ring-shaped vibrating body having a uniform plane;
a leg portion flexibly supporting the ring-shaped vibrating body and having a fixed end; and
a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of first detection electrodes for detecting a secondary vibration generated when an angular velocity is applied to the ring-shaped vibrating body, which are each disposed $(90/N)°$ apart clockwise and/or counterclockwise from corresponding one of the driving electrodes, and a group of second detection electrodes for detecting the secondary vibration, which are each disposed $(180/N)°$ apart from corresponding one of the first detection electrodes, each of the driving electrodes, the first detection electrodes, and the second detection electrodes is disposed in a region from an outer peripheral edge of the ring-shaped vibrating body to a vicinity of the outer peripheral edge and/or a region from an inner peripheral edge thereof to a vicinity of the inner peripheral edge, and metal tracks that are formed above the leg portion and that are electrically connected to corresponding first detection electrodes and are identical in number with metal tracks that are formed above the leg portion and that are electrically connected to corresponding second detection electrodes.

2. A vibrating gyroscope comprising:
a ring-shaped vibrating body having a uniform plane;
a leg portion flexibly supporting the ring-shaped vibrating body and having a fixed end; and
a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of monitor electrodes each disposed $(180/N)°$ apart from corresponding one of the driving electrodes, a group of first detection electrodes for detecting a secondary vibration generated when an angular velocity is applied to the ring-shaped vibrating body, which are each disposed $(90/N)°$ apart clockwise or counterclockwise from corresponding one of the driving electrodes, and a group of second detection electrodes for detecting the secondary vibration, which are each disposed $(180/N)°$ apart from corresponding one of the first detection electrodes, and each of the driving electrodes, the monitor electrodes, the first detection electrodes, and the second detection electrodes is disposed in a region from an outer peripheral edge of the ring-shaped vibrating body to a vicinity of the outer peripheral edge and/or a region from an inner peripheral edge thereof to a vicinity of the inner peripheral edge, and metal tracks that are formed above the leg portion and that are electrically connected to corresponding first detection electrodes and are identical in number with metal tracks that are formed above the leg portion and that are electrically connected to corresponding second detection electrodes.

3. The vibrating gyroscope according to claim 1, wherein the plurality of electrodes further include a group of monitor electrodes which are each disposed in a region from $\{(180/N)-(45/N)\}°$ to $\{(180/N)+(45/N)\}°$ except at angles $(180/N)°$ apart respectively from the driving electrodes, and each of the monitor electrodes is disposed in the region from the outer peripheral edge of the ring-shaped vibrating body to the vicinity of the outer peripheral edge and/or the region from the inner peripheral edge thereof to the vicinity of the inner peripheral edge.

4. The vibrating gyroscope according to claim 1, wherein all of the first detection electrodes and the second detection electrodes are disposed in only one of the region from the outer peripheral edge of the ring-shaped vibrating body to the vicinity of the outer peripheral edge and the region from the inner peripheral edge thereof to the vicinity of the inner peripheral edge, and an arithmetic circuit obtains a difference between a signal outputted from each of the first detection electrodes and that outputted from each of the second detection electrodes.

5. The vibrating gyroscope according to claim 1, wherein all of the first detection electrodes are disposed in one of the region from the outer peripheral edge of the ring-shaped vibrating body to the vicinity of the outer peripheral edge and the region from the inner peripheral edge thereof to the vicinity of the inner peripheral edge, and all of the second detection electrodes are disposed in a remaining one of the regions, and an arithmetic circuit or metal tracks, which are led out from the first detection electrodes and the second detection electrodes, connected together to obtain a sum of signals outputted respectively from the first detection electrodes and signals outputted respectively from the second detection electrodes.

6. The vibrating gyroscope according to claim 1, wherein the ring-shaped vibrating body is formed with a silicon substrate, and only the upper-layer metallic film, the piezoelectric film, and the lower-layer metallic film are substantially observable in a front view.

7. The vibrating gyroscope according to claim 1, wherein the ring-shaped vibrating body is formed with a silicon substrate, and only the upper-layer metallic film and the lower-layer metallic film are substantially observable in a front view.

8. A vibrating gyroscope comprising:
a ring-shaped vibrating body having a uniform plane;
a leg portion flexibly supporting the ring-shaped vibrating body and having a fixed end; and
a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of first detection electrodes for detecting a secondary vibration generated when an angular velocity is applied to the ring-shaped vibrating body, which are each disposed $(90/N)°$ apart clockwise and/or counterclockwise from corresponding one of the driving electrodes, and a group of second detection electrodes for detecting the secondary vibration, which are each disposed $(180/N)°$ apart from corresponding one of the first detection electrodes, each of the driving electrodes, the first detection electrodes, and the second detection electrodes is disposed in a region from an outer peripheral edge of the ring-ring-shaped vibrating body to a vicinity of the outer peripheral edge and/or a region from an inner peripheral edge thereof to a vicinity of the inner peripheral edge; and metal tracks that are formed above the leg portion, are electrically connected to the first detection electrodes and are disposed symmetrically with respect to a point in a front view, and metal tracks that are formed above the leg portion, are electrically connected to the second detection electrodes and are disposed symmetrically with respect to a point in a front view.

9. The vibrating gyroscope according to claim 1, wherein the metal tracks that are formed above the corresponding leg portions and are electrically connected to the first detection electrodes are disposed symmetrically with respect to a point in a front view, and the metal tracks that are formed above the corresponding leg portions and are electrically connected to the second detection electrodes are disposed symmetrically with respect to a point in a front view.

10. A vibrating gyroscope comprising:
a ring-shaped vibrating body having a uniform plane;
a leg portion flexibly supporting the ring-shaped vibrating body and having a fixed end; and
a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of first detection electrodes for detecting a secondary vibration generated when an angular velocity is applied to the ring-shaped vibrating which are each disposed $(90/N)°$ apart clockwise and/or counterclockwise from corresponding one of the driving electrodes, and a group of second detection electrodes for detecting the secondary vibration, which are each disposed $(180/N)°$ apart from corresponding one of the first detection electrodes, each of the driving electrodes, the first detection electrodes, and the second detection electrodes is disposed in a region from an outer peripheral edge of the ring-shaped vibrating body to a vicinity of the outer peripheral edge and/or a region from an inner peripheral edge thereof to a vicinity of the inner peripheral edge, wherein an electrode pad is disposed above the fixed end, the electrode pad being electrically connected to either one of the first detection electrodes or the second detection electrodes by way of a metal track that is formed above the leg portion.

11. A vibrating gyroscope comprising:
a ring-shaped vibrating body having a uniform plane;
a leg portion flexibly supporting the ring-shaped vibrating body and having a fixed end; and a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of monitor electrodes each disposed $(180/N)°$ apart from corresponding one of the driving electrodes, a group of first detection electrodes for detecting a secondary vibration generated when an angular velocity is applied to the ring-shaped vibrating body, which are each disposed $(90/N)°$ apart clockwise and/or counterclockwise from corresponding one of the driving electrodes, and a group of second detection electrodes for detecting the secondary vibration, which are each disposed $(180/N)°$ apart from corresponding one of the first detection electrodes, each of the driving electrodes, the monitor electrodes, the first detection electrodes, and the second detection electrodes is disposed in a region from an outer peripheral edge of the ring-shaped vibrating body to a vicinity of the outer peripheral edge and/or a region from an inner peripheral edge thereof to a vicinity of the inner peripheral edge, and metal tracks that are formed above the leg portion and are electrically connected to the first detection electrodes and are disposed symmetrically with respect to a point in a front view, and metal tracks that are formed above the leq portion and are electrically connected to the second detection electrodes and are disposed symmetrically with respect to a point in a front view.

12. The vibrating gyroscope according to claim 2, wherein the metal tracks that are formed above the corresponding leg portions and are electrically connected to the first detection electrodes are disposed symmetrically with respect to a point in a front view, and the metal tracks that are formed above the corresponding leg portions and are electrically connected to the second detection electrodes are disposed symmetrically with respect to a point in a front view.

13. A vibrating gyroscope comprising:

a ring-shaped vibrating body having a uniform plane;

a leg portion flexibly supporting the ring-shaped vibrating body and having a fixed end; and a fixed potential electrode formed above the plane, and a plurality of electrodes formed above the plane with a piezoelectric film sandwiched between an upper-layer metallic film and a lower-layer metallic film in a thickness direction thereof, wherein when N is a natural number of 2 or more, the plurality of electrodes include a group of driving electrodes for exciting a primary vibration of the ring-shaped vibrating body in a vibration mode of $\cos N\theta$, which are disposed $(360/N)°$ apart from each other in a circumferential direction, a group of monitor electrodes each disposed $(180/N)°$ apart from corresponding one of the driving electrodes, a group of first detection electrodes for detecting a secondary vibration generated when an angular velocity is applied to the ring-shaped vibrating body, which are each disposed $(90/N)°$ apart clockwise and/or counterclockwise from corresponding one of the driving electrodes, and a group of second detection electrodes for detecting the secondary vibration, which are each disposed $(180/N)°$ apart from corresponding one of the first detection electrodes, each of the driving electrodes, the monitor electrodes, the first detection electrodes, and the second detection electrodes is disposed in a region from an outer peripheral edge of the ring-shaped vibrating body to a vicinity of the outer peripheral edge and/or a region from an inner peripheral edge thereof to a vicinity of the inner peripheral edge; and an electrode pad is disposed above the fixed end, the electrode pad being electrically connected to a corresponding one of the first detection electrodes or the second detection electrodes by way of a metal track that is formed above the leg portion.

14. The vibrating gyroscope according to claim 2, wherein all of the first detection electrodes and the second detection electrodes are disposed in only one of the region from the outer peripheral edge of the ring-shaped vibrating body to the vicinity of the outer peripheral edge and the region from the inner peripheral edge thereof to the vicinity of the inner peripheral edge, and an arithmetic circuit obtains a difference between a signal outputted from each of the first detection electrodes and that outputted from each of the second detection electrodes.

15. The vibrating gyroscope according to claim 2, wherein all of the first detection electrodes are disposed in one of the region from the outer peripheral edge of the ring-shaped vibrating body to the vicinity of the outer peripheral edge and the region from the inner peripheral edge thereof to the vicinity of the inner peripheral edge, and all of the second detection electrodes are disposed in a remaining one of the regions, and an arithmetic circuit or metal tracks, which are led out from the first detection electrodes and the second detection electrodes, connected together to obtain a sum of signals outputted respectively from the first detection electrodes and signals outputted respectively from the second detection electrodes.

16. The vibrating gyroscope according to claim 2, wherein the ring-shaped vibrating body is formed with a silicon substrate, and only the upper-layer metallic film, the piezoelectric film, and the lower-layer metallic film are substantially observable in a front view.

17. The vibrating gyroscope according to claim 2, wherein the ring-shaped vibrating body is formed with a silicon substrate, and only the upper-layer metallic film and the lower-layer metallic film are substantially observable in a front view.

* * * * *